(12) United States Patent
Kataoka

(10) Patent No.: US 7,421,713 B2
(45) Date of Patent: Sep. 2, 2008

(54) SAFE SERVICE EXTENSION PLATFORM

(75) Inventor: Mitsuteru Kataoka, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 543 days.

(21) Appl. No.: 10/517,489

(22) PCT Filed: Jun. 11, 2003

(86) PCT No.: PCT/JP03/07390

§ 371 (c)(1),
(2), (4) Date: Dec. 10, 2004

(87) PCT Pub. No.: WO03/107182

PCT Pub. Date: Dec. 24, 2003

(65) Prior Publication Data

US 2005/0216921 A1  Sep. 29, 2005

(30) Foreign Application Priority Data

Jun. 12, 2002 (JP) .............................. 2002-171338

(51) Int. Cl.
*G06F 13/00* (2006.01)
(52) U.S. Cl. .................................................. 719/328
(58) Field of Classification Search .................. 719/328
See application file for complete search history.

(56) References Cited

U.S. PATENT DOCUMENTS 5,412,717 A    5/1995  Fischer
6,434,615 B1 *  8/2002  Dinh et al. ................... 709/224
6,735,623 B1 *  5/2004  Prust ........................... 709/219
6,944,868 B2 *  9/2005  Simpson et al. ............. 719/328
7,114,128 B2 *  9/2006  Koppolu et al. ............. 715/781
7,246,349 B2 *  7/2007  Moerdijk et al. ............ 717/170
2002/0032627 A1 *  3/2002  Perot et al. .................... 705/35
2002/0046301 A1    4/2002  Shannon et al.

(Continued)

FOREIGN PATENT DOCUMENTS

JP    2000-172646    6/2000

(Continued)

OTHER PUBLICATIONS

C. Peng et al., "Digital Television Application Manager", Multimedia and Expo, 2001, ICME 2001, IEEE International Conference on Aug. 22-25, 2001, Piscataway, NJ, USA, IEEE, Aug. 22, 2001, pp. 685-688, XP010662062, ISBN: 0-7695-1198-8.

(Continued)

*Primary Examiner*—Andy Ho
(74) *Attorney, Agent, or Firm*—Wenderoth, Lind & Ponack, L.L.P.

(57) ABSTRACT

The present invention is directed to a service-extensible, completely new "safe service extension platform" in which false access, by an execute form which implements a digital content providing service, can be eliminated without the need to deny a process which might cause the false access. The safe service extension platform, in which services are associated with an execute form and the services are extended by changing or adding the execute form, includes a service-dependent API for extending the services. The service extension from the execute form is carried out only by calling the service-dependent API.

17 Claims, 16 Drawing Sheets

U.S. PATENT DOCUMENTS

2004/0024846 A1* 2/2004 Randall et al. .............. 709/219

FOREIGN PATENT DOCUMENTS

| JP | 2001-5794 | 1/2001 |
| --- | --- | --- |
| JP | 2001-514411 | 9/2001 |
| JP | 3784423 | 3/2006 |
| WO | 99/10795 | 3/1999 |
| WO | WO 01/50725 | 7/2001 |

OTHER PUBLICATIONS

Ramin Firoozyé, "A Cross-Platform Plug-in Tookit. Creating dynamically extendable applications", Dr. Dobbs Journal, Redwood City, CA, US, vol. 18, No. 6, Jun. 1993, pp. 120 & 122-125., XP008038186.

Trent Jaeger et al., "Flexible Control of Download Executable Content", ACM Transactions on Information and System Security, vol. 2, No. 2, May 1999, pp. 177-228, XP007901929.

* cited by examiner

| SERVICE IDENTIFICATION Es | STATUS OF AUTOMATIC CONTENT DOWNLOAD |
|---|---|
| S1 | DOWNLOAD |
| S2 | NO DOWNLOAD |
| ⋮ | ⋮ |

C1 ↓    C2 ↓    Trs4

L1 → (S1 row), L2 → (S2 row)

SAFE SERVICE EXTENSION PLATFORM

BACKGROUND OF THE INVENTION

1. Field of the Invention

The present invention relates to a service-extensible, completely new "safe service extension platform" which realizes new dimensional safety in which false access by an execute form which implements a digital content providing service can be eliminated without the need to deny that a process which might cause the false access is included in the execute form. Specifically, it relates to a safe service extension platform which is capable of eliminating false access, such as a change of the status of another service, data corruption, and a system down of the platform itself, without the need of inference from the authenticity of the distributor of an execute form, while capable of changing or adding an execute form to achieve service extension, such as a change of a service function/feature or an addition of a new service.

2. Background of the Related Art

As described above, the present invention provides an unprecedented completely new "safe service extension platform", and therefore it is considerably difficult to give a suitable example thereof that should be given as a conventional art. Initially, three major features unique to the safe service extension platform which is believed to be proposed first by the present invention are described below. A first feature is service extensibility; a second feature is the assurance of safety; and a third feature is achievement of a seamless service extension operation.

The first feature "service extensibility" means that a different user interface is provided for each service, and a change of the user interface or an addition of an unexpected service can be carried out at any time. The second feature "assurance of safety" means that the safety is assured without the need to deny that a process, which might cause false access, is included in an execute form. The third feature "achievement of a seamless service extension operation" means that the operational procedure for service extension can be carried out with the same operational feeling as the operational feeling in utilizing the service.

As described above, the "safe service extension platform" which satisfies all of the three major features cannot be found in conventional art. However, if a conventional art example is required, a push-type service via the Internet which involves the use of a personal computer can be cited as satisfying only the first feature. PointCast(R) of PointCast Network is a push-type service which realizes a news distribution service. The utilization of a plurality of push-type service which involves the use of a personal computer is made possible by installing a browser, which is written in machine language and executed for each service, to the personal computer.

Here, the first feature of the present invention, i.e., the "service extensibility", is described in conjunction with the push-type service. A new service can be added by installing a browser, which executes a push-type service, to a hard disk of a personal computer. The browser is a computer program written in machine language, and provides a unique and different user interface for each service.

The installation of the browser is conventionally carried out as described below. For example, the browser is installed by firstly activating a file transfer protocol (e.g., ftp) client to download the browser to the client's hard disk, and then activating the downloaded browser. Also, before using a new browser, the browser's settings are operated with a setting menu incorporated in the browser.

The second feature of the present invention, i.e., the "assurance of safety", is conventionally based merely on speculation, and is not supported by a specific plan. Specifically, the safety of a browser is conventionally based merely on a desire that a malicious third party has not caused the browser to be infected with a computer virus or the like since the browser is obtained through a formal distributor, such as an official home page.

As for the third feature of the present invention, i.e., the "achievement of a seamless service extension operation", which means a high-level presentation function by a service, in conventional art, a different user interface is realized by changing a browser for each service, resulting in satisfaction of the requirement that different user interfaces are provided for a plurality of services, which is necessary to partially achieve a seamless operation.

Referring to FIG. 18, a conventional service-extensible service platform, which is not safe as described above, is described in detail. As shown in the figure, a conventional service platform PFc includes a service provision source 1610, a delivery system 120, and a terminal device 1630. The service provision source 1610 includes an execute file provider 1111 and a file transfer server 1611. The execute file provider 1111 may be a hard disk drive having an execute file stored therein. The file transfer server 1611 may be a Web server. As will be described later with reference to FIG. 19, the execute file is binary data, typified by a program file which is directly passed to an OS of the terminal device 1630 and executed.

The delivery system 120 transfers an execute file, which is transmitted from the service provision source 1610, to a terminal device 1630 which is spatially and temporally away therefrom.

The terminal device 1630 includes an executor 1133 and an execute file storage device 1132. The executor 1133 activates an execute file stored in the execute file storage device 1132 to execute any process in the terminal device 1630. For example, in the case of activating a file transfer program as an execute file, an execute file for executing a new service, which is received via the delivery system 120, is stored into the execute file storage device 1132. Also, a service can be provided to the user by executing the execute file which executes the service.

FIG. 19 shows by way of example data stored in the execute file storage device 1132 of the service platform PFc. In addition to FE (S1), which is an execute file for service S1, and FE (S2), which is an execute file for service S2, the execute file storage device 1132 has stored therein execute file FE(shell) for a shell for providing a user interface for platform operation, such as activation of an execute file, and FE (file transfer) which is a file transfer program for introducing execute file FE for executing a new service to the terminal device 1630 via the delivery system. Any of these execute files can be implemented in machine language.

FIG. 20 shows software hierarchy in the service platform PFc. As can be seen from the figure, in the service platform PFc, any execute files for executing any services can be newly introduced by activating the file transfer execute file. In this manner, an application layer is composed of execute files immediately above an OS layer composed of an OS (Operating System). As a result, a service-implementing execute file is able to directly reference and control the resource of the OS. Accordingly, the OS is vulnerable to a malicious execute file, and therefore it cannot be said that the service platform PFc is safe.

As for the first feature of the present invention, i.e., the "service extensibility", it is possible to simply introduce a new service, but conventionally it is not possible to introduce a new service which is seamlessly related to the content viewing as presented by the present invention. That is, the operability in the content viewing and the operability in the introduction of a new service are completely different from each other both in appearance and in procedure. For example, conventionally, in order to install a browser, it is necessary to activate a file transfer protocol client to download the browser to the client's hard disk, and to activate the downloaded browser. Also, before using a new browser, it is required to set the browser by operating a setting menu whose degree of usability is completely different from the degree of usability of a content viewing window of the browser.

Also, conventionally, functionality extension is carried out by using a user interface common to all services. Accordingly, the number of entries of various parameters (an installation destination directory, a user name, etc.) required for installing a program for service extension becomes a logical sum of parameters required for all services. Therefore, when installing a specific service extension program, there is a possibility that the user might be required to enter a basically unnecessary parameter.

In contrast, flexible service extensibility provided by a safe service extension platform according to the present invention realizes service extension with the same operational usability as the content viewing without closing a browser or carrying out a procedure whose usability is completely different from that of the content viewing. That is, it achieves the situation where service extension is carried out as an extension of a normal operation with the same usability as the usability of the content viewing with which the user is most familiar, and without causing the user to carry out operation with the usability specific to the service extension. However, as described above, such extensibility cannot be provided by a conventional service platform, and therefore there is a need for a method for realizing completely new service extension.

As for the second feature of the present invention, i.e., the "assurance of safety", in fact, it is not so rare that even in a browser obtained through an official distributor, a bug adversely affects the operation of another push-type service, or causes the entire system to go down. Thus, conventionally, it is necessary to assure that the binary data of the browser is valid, i.e., the binary data of the browser does not include a false access process. However, the assurance is based only on a trust-based relationship, and is not intended to ensure that the binary data of the browser includes no false access process.

On the other hand, the safety provided by the safe service extension platform according to the present invention is completely new dimensional safety in which execution of any execute form (corresponding to the browser in the exemplary conventional art) does not adversely affect another service nor cause the entire system to go down. In the conventional art, as a matter of course, such a scheme does not exist, and therefore there is a need for a completely new execution method.

Further, as for the third feature of the present invention, i.e., the "achievement of seamless service extension operation" which executes a high level presentation function, in the conventional art, it is not possible to establish a seamless relationship between service management and content viewing. This is because the service management is carried out with the setting menu of the browser. That is, operation related to the service management cannot be carried out in the content viewing window.

On the other hand, in a high level presentation function by the service provided by the safe service extension platform according to the present invention, content includes service settings. Therefore it has a high level representation equivalent to that of the content, and a server is able to freely set the details of presentation with the same usability of that of the content viewing.

For example, by combining a service setting function with a content using a high level description capability of, for example, filling out a questionnaire and returning it to the server, whereby the user answers the questionnaire for the user's interest, it is made possible to achieve a high level presentation function of setting user preference information for automatically selecting content. Also, the user is able to carry out a high level setting with a simple operation without being aware of when the content ends and the service setting begins.

In the conventional art, as a matter of course, there is no method for executing a high level presentation function by the service presented by the safe service extension platform according to the present invention.

Therefore, an object of the present invention is to provide a safe service extension platform which realizes the above three features.

BRIEF SUMMARY OF THE INVENTION

To achieve the above object, the present invention has the following aspects.

A first aspect of the present invention is directed to a safe service extension platform in which services are associated with an execute form, and the services are extended by changing or adding the execute form, the platform comprising a service-dependent API for extending the services, wherein the service extension from the execute form is carried out only by calling the service-dependent API.

Thus, in the first aspect, it is possible to ensure that the safety is not affected by whether the execute form is authentic.

In a second aspect based on the first aspect, the service extension is to provide a new service.

In a third aspect based on the first aspect, the service extension is to start using a service.

In a fourth aspect based on any one of the first, second, and third aspects, the extension of a target service is carried out only by calling the service-dependent API from an execute form associated with the target service.

In a fifth aspect based on any one of the first, second, and third aspects, a parent/child relationship is defined between a plurality of services. When a call for the service-dependent API is requested by the execute form and designates, as a process target, a service-dependent resource associated with a service, only when a service associated with the execute form is an ancestor of that service, service-dependent resource can be processed.

In a sixth aspect based on any one of the first, second, and third aspects, an execute form associated with a metaservice at least one of the services can be extended by the service-dependent API.

In a seventh aspect based on the sixth aspect, in the case of the execute form associated with the metaservice, all of the services can be extended by the service-dependent API. In the case where the execute form (DE) is not associated with the metaservice, the service-dependent API is unable to extend the services.

In an eighth aspect based on any one of the first, second, and third aspects, the execute form is a control content which satisfies requirements that are to be satisfied by contents, the control content (DC) is transmitted as a content together with at least one of the contents, information for designating the control content from at least one of the contents, and the service-dependent API can be processed only by the control content.

In a ninth aspect based on the eighth aspect, the service-dependent API controls automatic storage of a specific service content (DC).

In a tenth aspect based on any one of the first, second, third, fourth, fifth, sixth, seventh, eighth, and ninth aspects, the execute form is sent from at least one service provision portion, and received by at least one terminal device for executing the execute form.

Note that in one embodiment of the present aspect, the service extension can be carried out with the same operational usability as the content viewing without closing a browser or carrying out a procedure whose usability is completely different from that of the content viewing. That is, it achieves the situation where service extension is carried out unknowingly with the same usability as the usability of the content viewing with which the user is most familiar, and without causing the user to carry out an operation with the usability specific to the service extension.

Also, it is possible to achieve completely new dimensional safety in which execution of any execute form (corresponding to the browser in the exemplary conventional art) does not adversely affect another service nor cause the entire system to go down.

Further, in another embodiment, content includes service settings. Therefore it has a high level representation equivalent to that of the content, and it is a function which allows a server to freely set the details of presentation with the same usability of that of the content viewing. Also, the user is able to carry out a high level setting with a simple operation without being aware of when the content ends and the service setting begins.

DETAILED DESCRIPTION OF THE INVENTION

Figure 1:
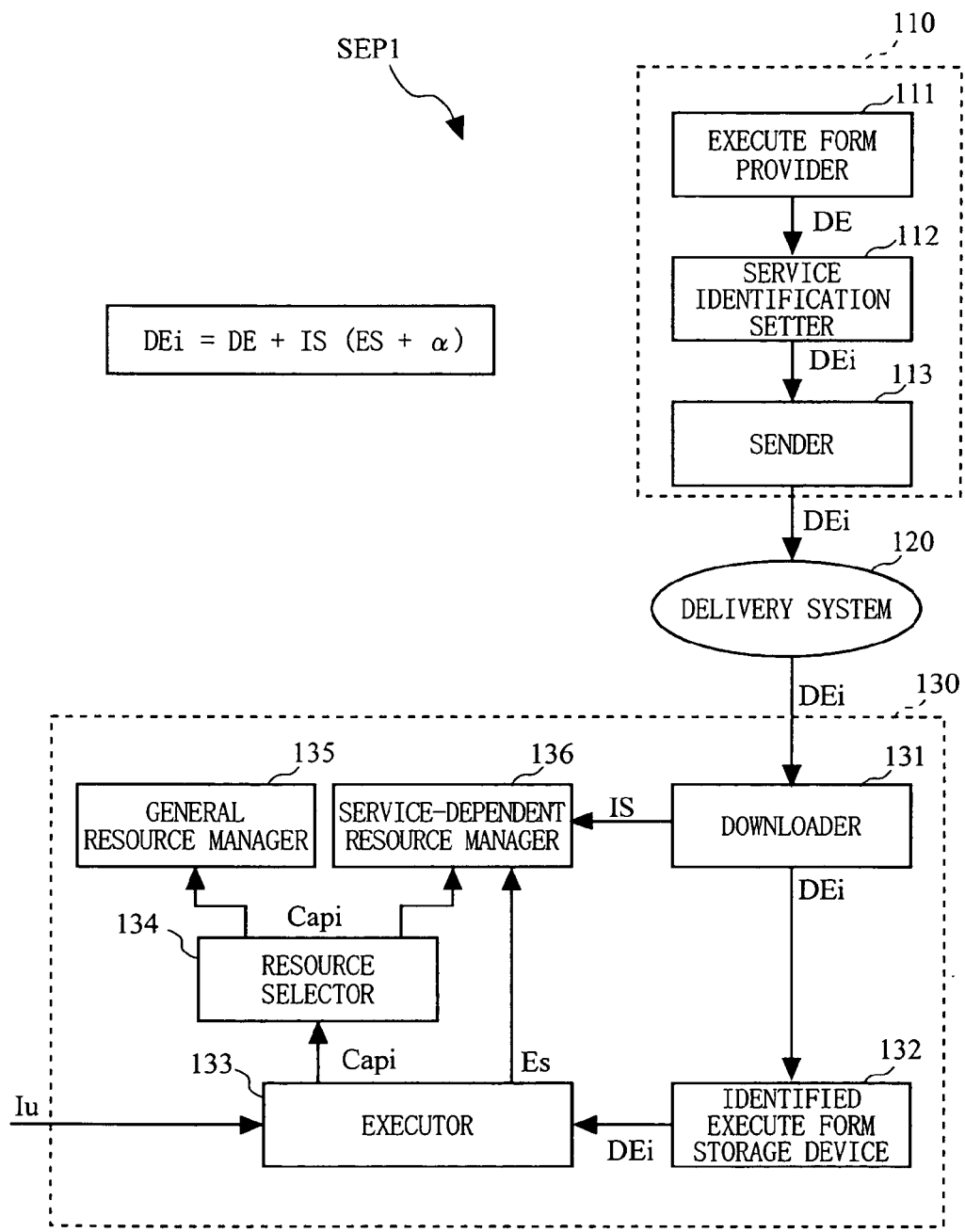
FIG. 1 is a block diagram schematically showing the structure of a safe service extension platform according to a first embodiment of the present invention.

Firstly, the basic concept of a safe service extension platform according to the present invention is described. In the safe service extension platform according to the present invention, a service is structured as an execute form which is configured as a so-called script, which is interpreted by an executor for instructing execution of an OS, rather than as, for example, a binary execute file which is directly executed by the OS as is conventionally the case. The execute form includes an API call, and is associated with a predetermined service.

The API is service-dependent, and when it is called, it behaves in a manner dependent on the associated service. The service-dependent API processes a resource specific to the service associated with the execute form in which the API is included. Also, any process which the execute form performs on the resource is restricted so as to be performed via an API, and there is no API, other than service-dependent APIs, which processes the resource processed by the service-dependent APIs. Also, a set of APIs written in the execute form are previously prepared commonly for all services, and they are identical to each other.

With this structure, it is possible to secure new dimensional safety, which does not depend on the authenticity of an execute file in the conventional art (or an execute form in the present invention), and to create a service-extensible, completely new "safe service extension platform". In this platform, by operating a browser, which is an example of an execute form for executing a service, it is made possible to view content which is an instance of a service. Ordinary content viewing is executed by sequentially calling APIs included in the content. Therefore, the execute form (browser) includes a service-dependent API which is a kind of API. Thus, the service is extended by calling the service-dependent API during the content viewing. As a result, in the present invention, the user sees the service extension as a content viewing operation.

The user interface for service extension is determined by the execute form including service-dependent APIs. By associating the execute form with services, it is made possible to extend each service using a user interface suitable for that service.

The user interface for service extension can be optimally configured for each service. For example, in the case of a push-type service/storage-type broadcasting service, a contract for a premium service subscribable only by specific members among all members of the service can be solicited only from the specific members through the use of an ordinary service content. Since the user interface can be sufficiently customized in accordance with the purpose thereof, solicitation for services can be carried out in a more appropriate and stronger manner.

If the present invention is applied to a Java application (i-appli or the like) which is used in mobile telephones, etc., by writing a program for extending a service function in application software for executing a service to which the user subscribes, it is possible to execute a functional extension of the service. For example, an operation of extending an i-appli function, such as a skin, as a plug-in can be executed by the i-appli itself.

Further, by writing a conditional judgment in content with a script included in the content, such that an API is called, which in response to a question, returns a character string representing the model number of a receiver or the type of a manufacturer, it is made possible to change a user interface for each receiver model number or for each manufacturer.

Also, if it is applied to a pay-per-view program in digital broadcasting, by writing algorithm suitable for distributed content, it is possible to manage a time period or channel for which free introductory viewing is possible by using the algorithm programmed in the content. In the case of the pay-per view program in the digital broadcasting, a contract for a pay-per-view service can be made through data broadcasting on a pay-per-view channel. Also, it is possible to provide a service, which varies from one user to another and leads to contract promotion, in such a manner that only the user who achieves a high score in a game on data broadcasting can hold a service contract at low price.

Further, if content is programmed so as to execute a service-dependent API, the user performs a predetermined operation on the content, thereby performing seamless service extension on the content without losing the content's description capability.

For example, in the case of installing a plug-in for a Web browser, it is possible to install the plug-in at the time of reception of content without accessing a download page of the development vender of the plug-in in order to obtain an install program for the plug-in. Also, the user is not required to be familiar with trade names of plug-ins for the Web browser, and content can be executed by selecting the description of the content itself, such as "a moving image of a product viewed from a 360-degree angle".

Also, if it is applied to an electronic book player or a PDA, it is possible to provide a function of, when a specific home page is entered, automatically preparing a browser, which is exclusively used for displaying a bulletin board required by the home page, without being noticed by the user. That is, user interfaces for use in content viewing and service extension can be configured seamlessly. Since the service extension can be carried out using a user interface with the same operational usability as the content viewing, the load on the user is insignificant.

Further, if service-dependent APIs are added as APIs that are to be sequentially executed, the service-dependent APIs can be sequentially executed similar to other APIs by executing the execute form. As a result, it is possible to program the execute form so as to automatically execute the service extension. Also, if full automation is achieved, it is possible to execute temporary service extension, such as an exclusive service for use during traveling or a free trial, without making the user aware of it.

For example, in the case of an electronic book player or a PDA, it is possible to provide a title with a screen effect for page turning as a bonus plug-in which is only usable with that title. Also, it is possible to automatically utilize an on-the-spot service, such as a virtual guide to facilities at Narita airport.

Further, in the present invention, it is ensured that the service extension is carried out with the same operational usability as the content viewing without closing a browser or carrying out a procedure whose usability is completely different from that of the content viewing. Specifically, it is possible to provide an environment where a service extension is carried out without the user being aware of it and with the same usability as the usability of the content viewing with which the user is most familiar, so that the user is not caused to carry out operation with the usability specific to the service extension.

For example, in the case of a push-type service/storage-type broadcasting service, it is not necessary for the user to be accustomed to usage of a plurality of user interfaces, e.g., downloading after activating an upgrading function of a viewer in order to upgrade the viewer itself, or a Web browser in order to introduce another service.

Therefore, even in the case where it is necessary to properly use a plurality of browsers depending on the details of content or the user's preferences, the user is not required to become accustomed to different levels of operability of various user interfaces. Accordingly, even an unaccustomed user can be reassured and readily carry out functional extension. Moreover, once a viewing device is shipped, the user interface is not permanently fixed and the operability thereof can be improved depending on the user's preferred level of usability.

Further, it is common to all aspects to ensure completely new dimensional safety in which execution of any execute form (corresponding to the browser in the exemplary conventional art) does not adversely affect another service nor cause the entire system to go down.

FIRST EMBODIMENT

Referring to FIGS. 1, 2, 3, 4, 5, 6, and 7, a safe service extension platform according to a first embodiment of the present invention is described. As shown in FIG. 1, a safe service extension platform SEP1 according to the present embodiment includes a service provision source 110, a delivery system 120, and a terminal device 130.

The service provision source 110 sends out an execute form for executing a new service that is to be executed by the terminal device 130. The delivery system 120 temporally and/or spatially transfers information sent from the service provision source 110 to the terminal device 130. The delivery system 120 can be composed of an internet communications network, a broadcasting or communications radio network, or a combination of a package medium, such as a DVD-ROM (Digital Versatile Disk-Read Only Memory), and a physical logistics system.

The terminal device 130 uses the information received via the delivery system 120 to execute the service provided by the service provision source 110, and provides an execution result to the user. Note that in FIG. 1, for the sake of simplification, the service provision source 110, the delivery system 120, and the terminal device 130 are illustrated such that the ratio in number of them is 1:1:1. However, the ratio in number may be 1:1: c (where c is an arbitrary natural number) similar to the ratio seen in a broadcast topology, may be a:1:c (where a is an arbitrary natural number) in the case of the Internet or the like, or may be a:b:c (where b is an arbitrary natural number) in the case where there are a plurality of delivery systems. Such generalization is applicable to all embodiments as described below.

The service provision source 110 includes an execute form provider 111, a service identification setter 112, and a sender 113. The execute form provider 111 has stored therein execute forms for executing services, and outputs them if the necessity arises. The execute forms may be SGML (Standard Generalized Markup Language)-based/XML (eXtensible Markup Language)-based markup languages, such as HTML languages (HyperText Markup Languages) for use in the Internet, BML languages (Broadcast Markup Languages) for use in data broadcasts in Japanese digital broadcasting, or may be Java(R) languages or machine languages which operate on a virtual machine. Note that it is so configured that the execute forms are passed to an OS of the terminal device 130 via an executor, which is provided in the terminal device 130 as will be described later, and executed by the OS.

The service identification setter 112 generates associated information IS about execute form DE outputted from the execute form provider 111, which indicates a subsidiary matter, such as an attribute of the execute form DE, and adds it to the execute form DE to generate identified execute form DEi. The associated information IS includes service identification information Es, which is information for associating with a service that is to be executed by a corresponding execute form DE, and subsidiary information $\alpha$, which indicates information about conditions and status of use of the execute form DE and the details of a corresponding service. For example, the service identification information Es may be an ID, which is a unique number, or may be a name. The subsidiary information a may be either a text or a code. Also, the identified execute form DEi may be generated such that the execute form DE and the associated information IS are integrated together, or they may be generated individually. In the present embodiment, the associated information IS i described by taking as an example a case where it is generated individually.

The sender 113 sends identified execute form DEi (execute form DE and associated information IS), which is inputted from the service identification setter 112, to the delivery system 120. A transmission model for realizing such sending may be either of the so-called pull- and push-types.

The pull-type refers to a transmission model which carries out sending in accordance with a demand from the terminal device 130 on the reception side, as can be seen in, for example, an HTTP (HyperText Transport Protocol) which is a transmission protocol for use in browsing homepages on the Internet. The push-type refers to a transmission model which carries out sending at a predetermined time regardless of a demand from the reception side, as can be seen in, for example, a DSM-CC (Digital Storage Media Command & Control) data carousel which is a transmission protocol for use in transmission in digital broadcasting.

The terminal device 130 includes a downloader 131, an identified execute form storage device 132, an executor 133, a resource selector 134, a general resource manager 135, and a service-dependent resource manager 136. The downloader 131 receives identified execute form DEi (execute form DE and associated information IS), which is transmitted from the delivery system 120, and writes the received identified execute form DEi to the identified execute form storage device 132. The downloader extracts the associated information IS from the identified execute form DEi, and outputs it to the service-dependent resource manager 136. The associated information IS includes the service identification information Es which is set by the service identification setter 112 in a manner as described above. The downloader 131 is in conformity with a transmission model realized by the sender 113 and the delivery system 120, and can be executed in either case of a push-type or pull-type.

The identified execute form storage device 132 stores the identified execute form DEi (execute form DE and associated information IS) which has been written by the downloader 131. Also, in response to a demand, the identified execute form storage device 132 outputs the stored identified execute form DEi to the executor 133. The identified execute form storage device 132 can be composed of a storage medium, such as a hard disk drive (HDD) or a DVD-RAM, or a semiconductor memory such as flash memory or a RAM.

Figure 2:
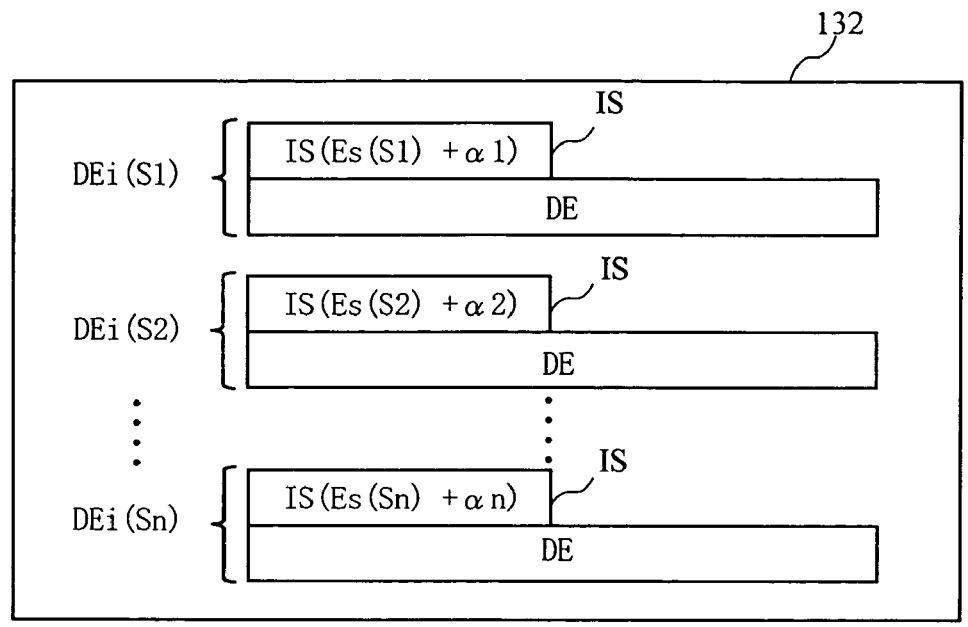
FIG. 2 is a diagram for explaining an identified execute form stored in an identified execute form storage device of the safe service extension platform shown in FIG. 1.

FIG. 2 shows how the identified execute form DEi is stored in the identified execute form storage device 132 accordance to the present embodiment. In this example, as for service S1, and services S2 through Sn (where n is an arbitrary natural number), identified execute form DEi (S1) corresponds to the service S1, identified execute form DEi(S2) corresponds to the service S2, and identified execute form DEi(Sn) corresponds to the service Sn.

The identified execute form DEi(S1) includes associated information IS(S1) consisting of service identification information Es (S1) and subsidiary informational, each of which corresponds to the service S1, and it also includes an execute form DE. Specifically, the service identification information Es(S1) associates the execute form DE with the service S1. Similarly, the identified execute form DEi (S2) includes associated information IS(S2) consisting of service identification information Es(S2) and subsidiary information $\alpha 2$, each of which corresponds to the service S2, and it also includes an execute form DE. Further, the identified execute form DEi (Sn) includes associated information IS(Sn) consisting of service identification information Es (Sn) and subsidiary information an, each of which corresponds to the service Sn, and it also includes an execute form DE. The service identification information Es(Sn) associates the execute form DE with the service S2.

In the case where there is no need to individually distinguish between services, identified execute form DEi is represented as being composed of associated information IS consisting of service identification information Es and subsidiary information $\alpha$, and execute form DE. If it is necessary to individually distinguish between services, identified execute form DEi (So) is represented as being composed of associated information IS(So) consisting of service identification information Es(So) and subsidiary information $\alpha$o, and execute form DE. Note that "o" is an arbitrary natural number less than or equal to n.

Referring back to FIG. 1, the executor 133 interprets execute form DE contained in identified execute form DEi inputted from the identified execute form storage device 132, and executes a service. As described above, the execute form DE contained in the identified execute form DEi stored in the identified execute form storage device 132 has a feature that in the terminal device 130, it can be interpreted and executed by nothing other than the executor 133. The executor 133 executes interactive processes, such as input Iu by the user via an input device, such as a keyboard, a pointing device, or a speech input device, and output to an output device, such as a display in a GUI window or speech output, in accordance with a procedure based on the execute form DE.

If the execute form DE is a Java(R) language or a markup language, the executor 133 may be a virtual machine or an execution environment, which is generally called "browser". Alternatively, if the execute form DE is a machine language, the executor may be a middleware group, such as a library accompanying an OS for executing the execute form.

If an execute form DE that is to be interpreted and executed includes API (Application Program Interface) call Capi, the executor 133 uses the resource selector 134 to request the general resource manager 135 or the service-dependent resource manager 136 to issue the API call Capi for process execution. Also, the executor 133 notifies the service-dependent resource manager 136 of service identification information Es associated with the execute form DE that is currently being executed.

The resource selector 134 determines, based on the API call Capi issued by the executor 133, whether it is the general resource manager 135 or the service-dependent resource manager 136 that is being requested to carry out an API process. Then, the API call Capi is transferred to the one which has been determined as being requested. Note that the API call Capi is classified as a general API that is to be processed by the general resource manager 135 (hereinafter, referred to as a "general API") or as an API that is to be processed by the service-dependent resource manager 136 (hereinafter, referred to as a "service-dependent API").

The term "resource" refers to any computer resource which can be referenced, modified, or controlled by the terminal device 130 by means of the executor 133. Specifically, it includes a data structure stored in a primary storage device, such as a RAM, or a secondary storage device, such as a HDD, access right to a controllable input/output device, tangible input/output control, and communications control. Among these resources, a resource which can be processed without affecting another service is defined as a general resource, while a resource which exists for each service and is required to be processed for extending the service is defined as a service-dependent resource. An API for the general resource is defined as a general API, while an API for the service-dependent resource is defined as a service-dependent API.

The following description is directed to exemplary relationships between two APIs and the same resource. It is assumed that one API refers to the resource and does not affect another service, while the other API modifies the resource and thus affects another service. In this case, the former corresponds to the general API, and the latter corresponds to the service-dependent API. In the following description, however, for simplification of the description, it is assumed that a resource for reference and a resource for modification are individually present and the former and latter are consistent in detail with each other.

As a specific example of the service-dependent API, a function for changing the status of use of the service (hereinafter, referred to as a "service use status operation function"). Based on the service use status operation function, whether the user utilizes an individual service with the terminal device 130 is designated, and the process that is to be carried out by the terminal device 130 for providing the service is controlled so as to be activated or ceased. Specifically, the process includes a preprocess, such as initialization of the execute form DE or internal data of the identified execute form DEi, and reception of necessary information, and conclusion of a service use agreement, billing, and user registration, which are conducted with respect to a service provision portion via a delivery system.

Specific examples of the general API include operation of an input/output device, such as an on-screen display or a keyboard entry with the terminal device reception portion 130, and data reading/writing from/to a temporary storage device, such as a RAM, or a secondary storage device, such as a HDD. In an exemplary case where an on-screen display is a resource of the general API, if on-screen displays corresponding to a plurality of services occur simultaneously, it is conceivable that conflict occurs between services. However, in the present embodiment, if a constraint in which only one service actually occupies the screen at a time is executed by the general resource manager 135 or an API call method, no conflict actually occurs to any execute form DE.

The general resource manager 135 stores and manages the general resource. Moreover, the general resource manager 135 references and operates the general resource based on API call Capi which is inputted from the resource selector 134. For example, when an API for screen drawing is called, an instruction is issued to a graphics display device which is a general resource for carrying out screen drawing.

The service-dependent resource manager 136 stores and manages the service-dependent resource. It references and operates service-dependent resource RS based on API call Capi which is inputted from the resource selector 134. Also, it performs a management process of the service-dependent resource RS based on associated information IS inputted from the downloader 131.

Figure 3:
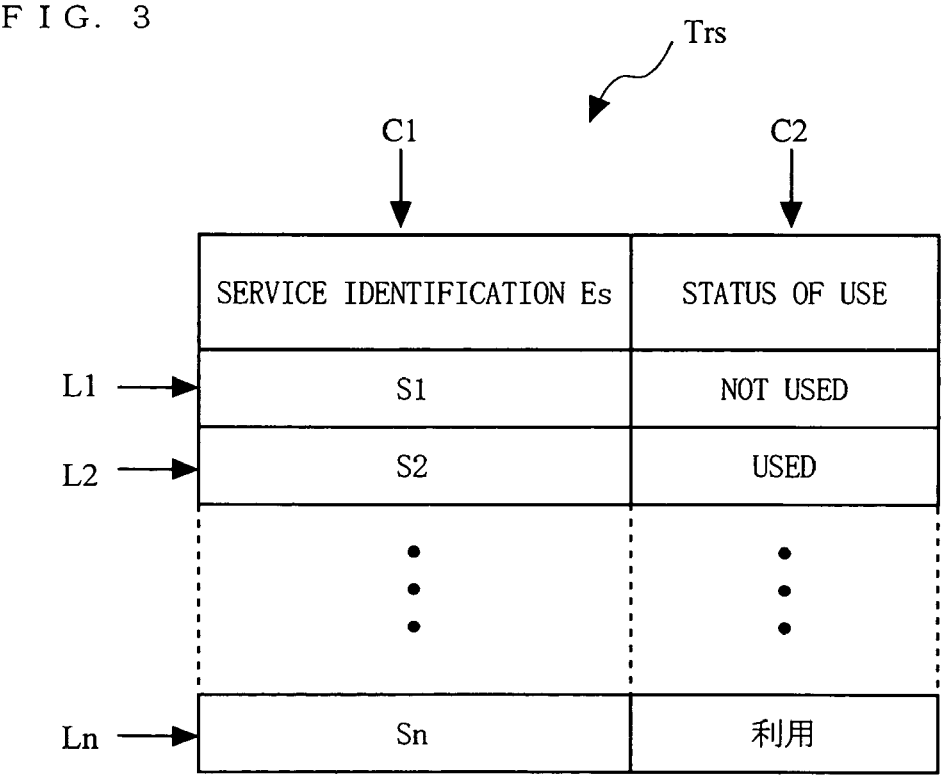
FIG. 3 is a diagram for explaining a service-dependent resource management table managed in a service-dependent resource manager of the safe service extension platform shown in FIG. 1.

Referring to FIG. 3, a service-dependent resource management table Trs which is generated for managing the service-dependent resource RS stored in the service-dependent resource manager 136 is described. As illustrated in FIG. 3, the service-dependent resource management table Trs is a database configured in a matrix with at least a plurality of rows L1 through Ln indicating n types of services S1 through Sn and two columns C1 and C2 indicating the status of use of each service S. Specifically, in FIG. 3, row L1 corresponds to service S1, row L2 corresponds to service S2, row Ln corresponds to service Sn (in this case, n is a natural number equal to or more than 3). Column C1 corresponds to the service identification information Es, and column C2 corresponds to the status of use.

More specifically, as schematically shown in FIG. 2, values in columns C1 and C2 are determined and written based on Sn of the service identification information Es(Sn) and subsidiary information αn. It is understood that in the example shown in FIG. 3, service S1 indicated in row L1 is "NOT USED", service S2 indicated in row L2 is "USED", and service Sn indicated in row Ln is "USED". In this manner, rows L1 through Ln are respectively provided for storing information for identifying services of different services S1 through Sn. In this context, rows L1 through Ln (row Lo) are referred to as "service identification rows".

Next, an operation for adding a new service identification row is described. If the downloader 131 receives a service (identified execute form DEi), a service identification row for defining a service-dependent resource RS to which execute form DE stored in the identified execute form storage device 132 corresponds is added to the service-dependent resource management table Trs. This process automatically introduces the service to the terminal device 130, so that the new service is registered and managed in the service-dependent resource manager 136.

Figure 4:
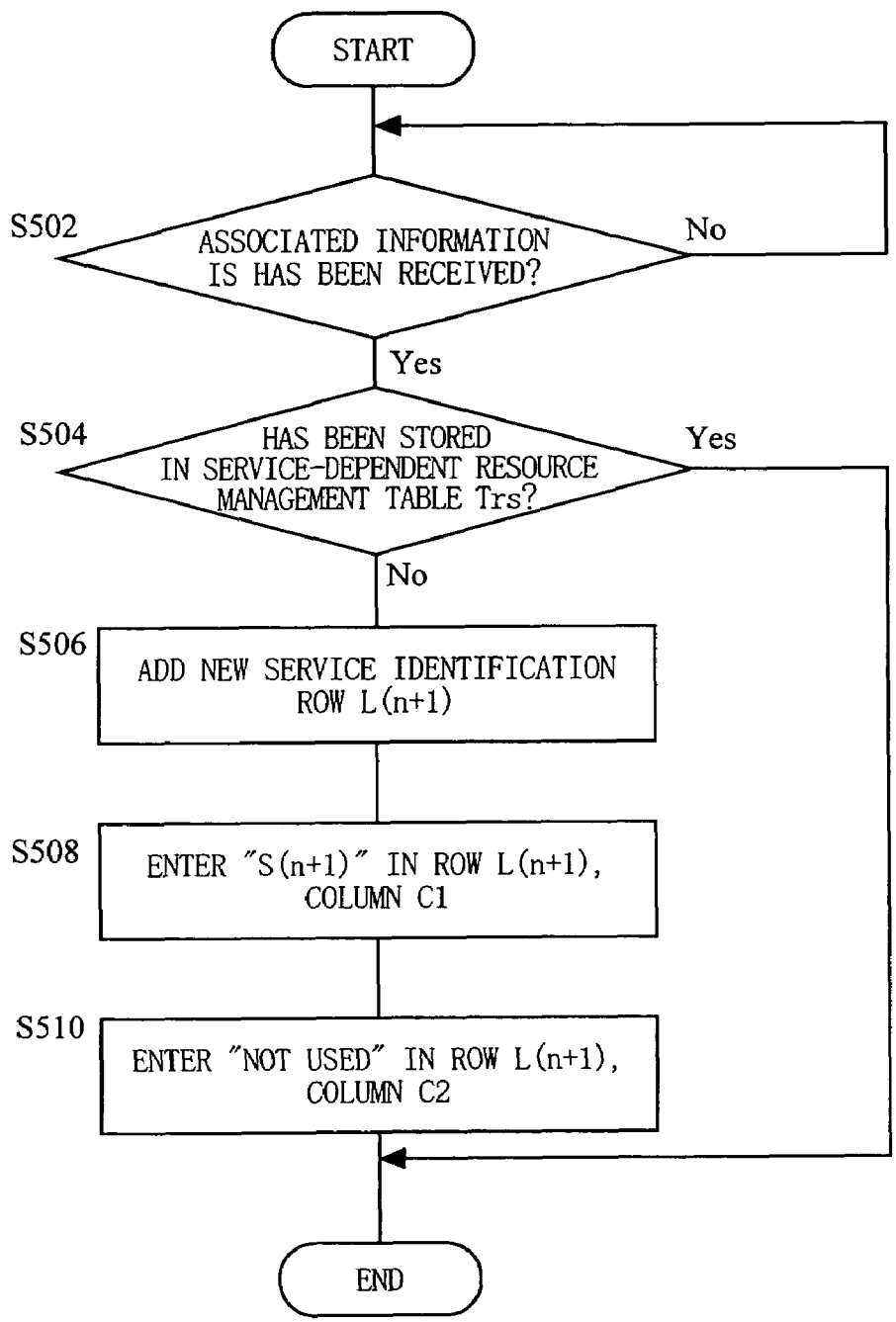
FIG. 4 is a flowchart showing a new service registration/management operation by the service-dependent resource management of the safe service extension platform shown in FIG. 1.

Referring to FIG. 4, an operation of a new service registration/management routine by the service-dependent resource manager 136 is described below. An identified execute form DEi (execute form DE and associated information IS) corresponding to a new service is sent out from the service provision source 110 to the terminal device 130, and first inputted to the downloader 131. The downloader 131 extracts the associated information IS from the identified execute form DEi, and outputs it to the service-dependent resource manager 136. Then, in the service-dependent resource manager 136, the operation of the present routine starts at the time the associated information IS is inputted.

Accordingly, at step S502, it is determined whether the associated information IS has been inputted to the service-dependent resource manager 136. If it has not been inputted, "No" is assumed, and the process of the present step is repeated. On the other hand, in the case of "Yes", the procedure proceeds to the next step S504. Specifically, a new service registration/management process does not substantially start until the service-dependent resource manager 136 receives the associated information IS from the downloader 131.

At step S504, it is determined whether service S, indicated by service identification information Es of the associated information IS received at step S502, has already been registered in the service-dependent resource management table Trs stored in the service-dependent resource manager 136. If the service is not included, i.e., not registered, "No" is assumed, and the procedure proceeds to the next step S506.

At step S506, in the service-dependent resource manager 136, a new service identification row (Ln+1) corresponding to the new service is added to the service-dependent resource management table Trs. The following description is given by taking as an example the service-dependent resource management table Trs shown in FIG. 3. Since the service-dependent resource management table Trs has registered therein, services S1 through Sn, the service identification row L (n+1) is added in order to register a new service S(n+1). Then, the procedure proceeds to the next step S508.

At step S508, S(n+1) which is a value for identifying the service S(n+1) is entered in row L(n+1), column C1 based on the service identification information Es contained in the associated information IS that has been received anew. Then, the procedure proceeds to the next step S510.

At step S510, "NOT USED" is entered in the cell for the status of use in row L(n+1), column C2 which has been added to the service-dependent resource management table Trs. This is because it is so arranged that "NOT USED" is set as an initial status when a new service (identified execute form DEi) is received. However, it may be so arranged that "USED" is set as the initial status or trial use is offered as a demonstration for a predetermined time period, or the service identification setter 112 may provide, for each service, information indicating whether the initial status is employed as the associated information IS (subsidiary information a). The present routine ends after the present step is completed.

In contrast, at the above step S504, if "Yes" is assumed, i.e., it is determined as being included, the above steps S506, S508 and S510 are skipped, and the procedure of the present routine is terminated. Specifically, if the service received by the downloader 131 is a service which has already been introduced, no service registration is required, and therefore the procedure of the present routine is immediately terminated.

Figure 5:
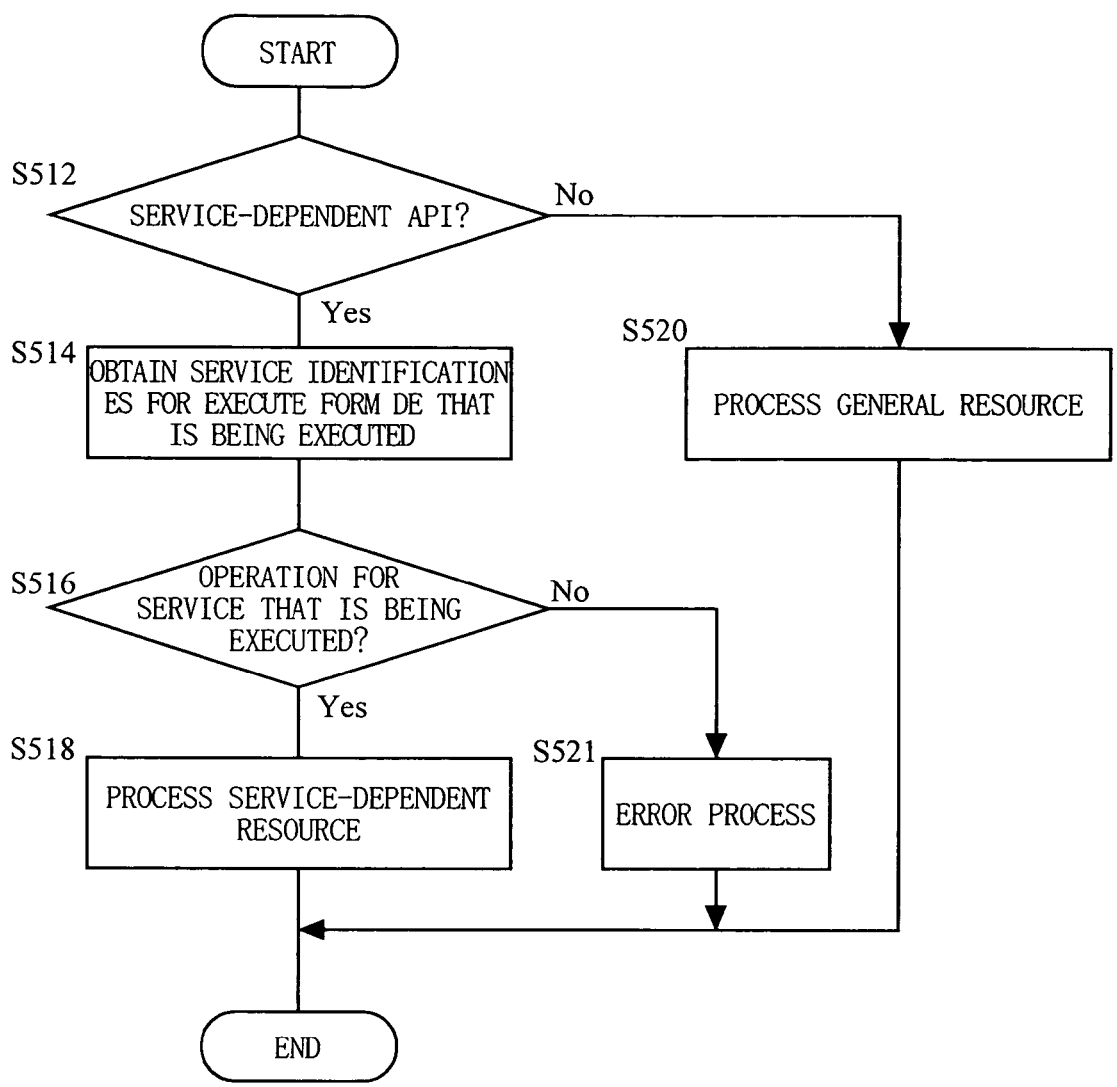
FIG. 5 is a flowchart showing a service execution operation by a terminal device of the safe service extension platform shown in FIG. 1.

Next, referring to FIG. 5, an operation of a service execution routine by the terminal device 130 is described. Specifically, in the terminal device 130, service execution is realized by executing an execute form DE corresponding to an API called by the executor 133. More specifically, a substantial procedure of the present routine starts at the time the executor 133 issues API call Capi in order to execute the execute form DE contained in an identified execute form DEi which is inputted from the identified execute form storage device 132.

Accordingly, at step S512, the resource selector 134 determines, based on the API call Capi issued by the executor 133, whether the called API is a service-dependent API. If it is the service-dependent API, "Yes" is assumed, and the procedure proceeds to the next step S514.

At step S514, the service-dependent resource manager 136 obtains, from the executor 133, service identification information Es of a service associated with an execute form DE that is currently being executed. Then, the procedure proceeds to the next step S516.

At step S516, the service-dependent resource manager 136 determines whether a service-dependent resource RS which is specified as a process target by the API call Capi corresponds to the service corresponding to the execute form DE detected at step S514 that is currently being executed. If it corresponds to the service corresponding to the execute form DE that is being executed, "Yes" is assumed, and the procedure proceeds to the next step S518.

At step S518, the service-dependent resource manager 136 uses the service-dependent API to process the service-dependent resource, and the procedure of the present routine ends.

In contrast, at the above step S512, if "No" is assumed, i.e., it is determined as not being the service-dependent API (i.e., it is a general API), the procedure proceeds to step S520.

At step S520, the general resource manager 135 processes a general resource, and the procedure of the present routine is terminated.

Further, at the above step S516, if "No" is assumed, i.e., it does not correspond to the service corresponding to the execute form DE that is being executed, the procedure proceeds to step S521.

At step S521, an error process is performed, and thereafter the present routine ends. In this manner, settings are made so as not to permit an API process to be performed on a service-dependent resource which cannot be operated (No at S516) even in the case of the service to which the execute form DE that is being executed corresponds (Yes at S512).

In other words, in the present embodiment, only the service-dependent resource for the service associated with the execute form DE that is being executed is set so as to be operable. Accordingly, even if any API call is issued depending on the execute form DE, the service-dependent resource manager 136 prevents another service from being referenced or operated. Specifically, even if an execute form DE of a service which is intended to reference or operate another service is inputted, the procedure proceeds through step S516 to step S521, where an error process is performed to prevent such reference or operation, while making it possible to detect such a demand.

As described above, in the present embodiment, at step S512, the resource selector 134 exerts control in such a manner that the process on the service-dependent resource can be operated only by the service-dependent API. This is described with reference to a software hierarchy of the terminal device 130 of a safe service extension platform SEP1 shown in FIG. 6.

Figure 6:
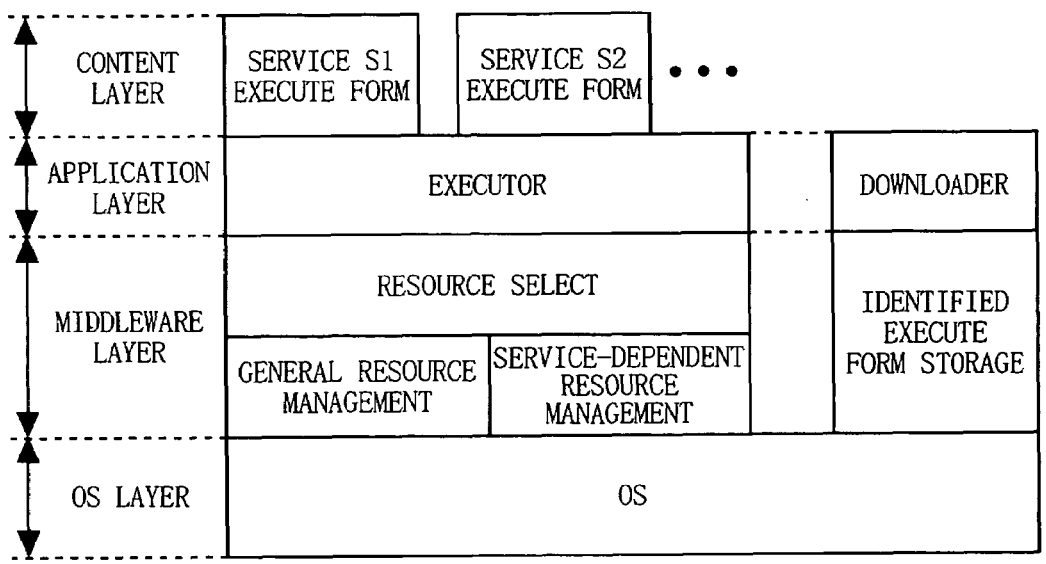
FIG. 6 is a diagram for explaining a software hierarchy of a terminal device of the safe service extension platform shown in FIG. 1.

As shown in FIG. 6, if the terminal device 130 of the safe service extension platform SEP1 is viewed in terms of its software structure, it is found that an OS layer realized by an OS which is basic software is present at the bottom. Provided on the OS layer are general resource management software, service-dependent resource management software, and identified execute form storage software, which respectively operate the general resource manager 135, the service-dependent resource manager 136, and the identified execute form storage device 132. Further, provided on the general resource management software and the service-dependent resource management software is resource select software which operates the resource selector 134. The general resource management software, the service-dependent resource management software, the resource select software, and the identified execute form storage software constitute a middleware layer.

Provided on the resource select layer of the middleware layer is execute software (executor) for operating the executor 133, and provided on the identified execute form storage software is download software (downloader) for operating the downloader 131. The execute software and the download software constitute an application layer.

Furthermore, provided on the execute software of the application layer are service S1-Sn execute forms which execute services S1 through Sn, respectively, and constitute a content layer.

As is apparent from the software structure shown in FIG. 6, in the safe service extension platform SEP1, execute form DE of a service is not able to reference or operate a resource which is called by an API through the medium of the resource selector. Accordingly, as for the service-dependent resource, it is required to call a service-dependent API, wherein referencing or operation are not possible if not via the service-dependent resource manager 136.

Figure 7:
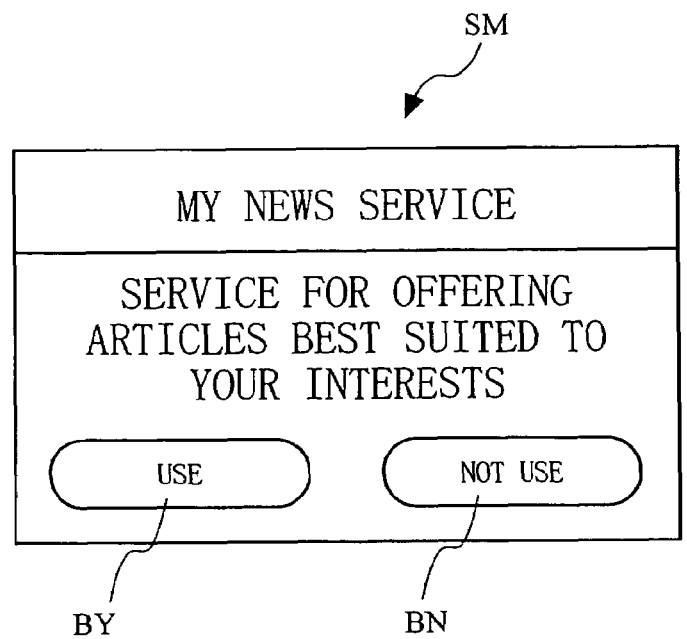
FIG. 7 is a diagram for explaining an exemplary screen image presented to the user by the safe service extension platform shown in FIG. 1.

Next, an operation of changing a newly added service into a state that is actually used is briefly described with reference to an exemplary screen image shown in FIG. 7 which is presented to the user by the safe service extension platform SEP1. FIG. 7 shows an exemplary screen image displayed by the execute form DE to prompt the user as to whether he/she wants to start using a new service.

Screen image SM is an exemplary screen image presented when the executor 133 executes an execute form DE executing a new service "MY NEWS SERVICE". On the screen image SM, button BY for declaring the use of the service and button BN for declaring no intention of use are arranged. The user operates an input device to select the button BY, thereby starting the service.

Here, an operation in the case where the button BY is selected is described. The button BY is programmed in the execute form DE so as to activate the service-dependent API to declare the start of using the service. Accordingly, if the button BY is selected, the service-dependent API is delivered through the resource selector 134 to the service-dependent resource manager 136, so that the value entered in the cell for the status of use of the service corresponding to the service-dependent resource RS in the service-dependent resource management table Trs is rewritten to the "USED".

Note that although the start of simply using the service is described in relation to the example shown in FIG. 7, it is also possible to conclude a service use agreement with a service provision portion, conduct user registration, or start an automatic storing process before viewing a storage-type data broadcast.

In this manner, it is possible to perform a service-related operation, such as the transition of the status of whether the service is used or not unused, through the interaction with the user based on the execute form DE of the service itself. Further, even if another service is executed with an execute form DE with any malicious intent, it is possible to avoid any adverse effect, e.g., a malfunction or hang-up, on the service or the platform.

As described above, in the safe service extension platform SEP1 according to the first embodiment of the present invention, while maintaining the service extensibility, it is possible to achieve complete safety in which any execute form DE that can be assumed does not cause a false process to affect another service or the platform itself, rather than obtaining unreliable safety in which if the identity of the distributor of that execute form DE seems to be authentic, it is analyzed that execute form DE does not include a code which might cause a false process.

SECOND EMBODIMENT

Figure 8:
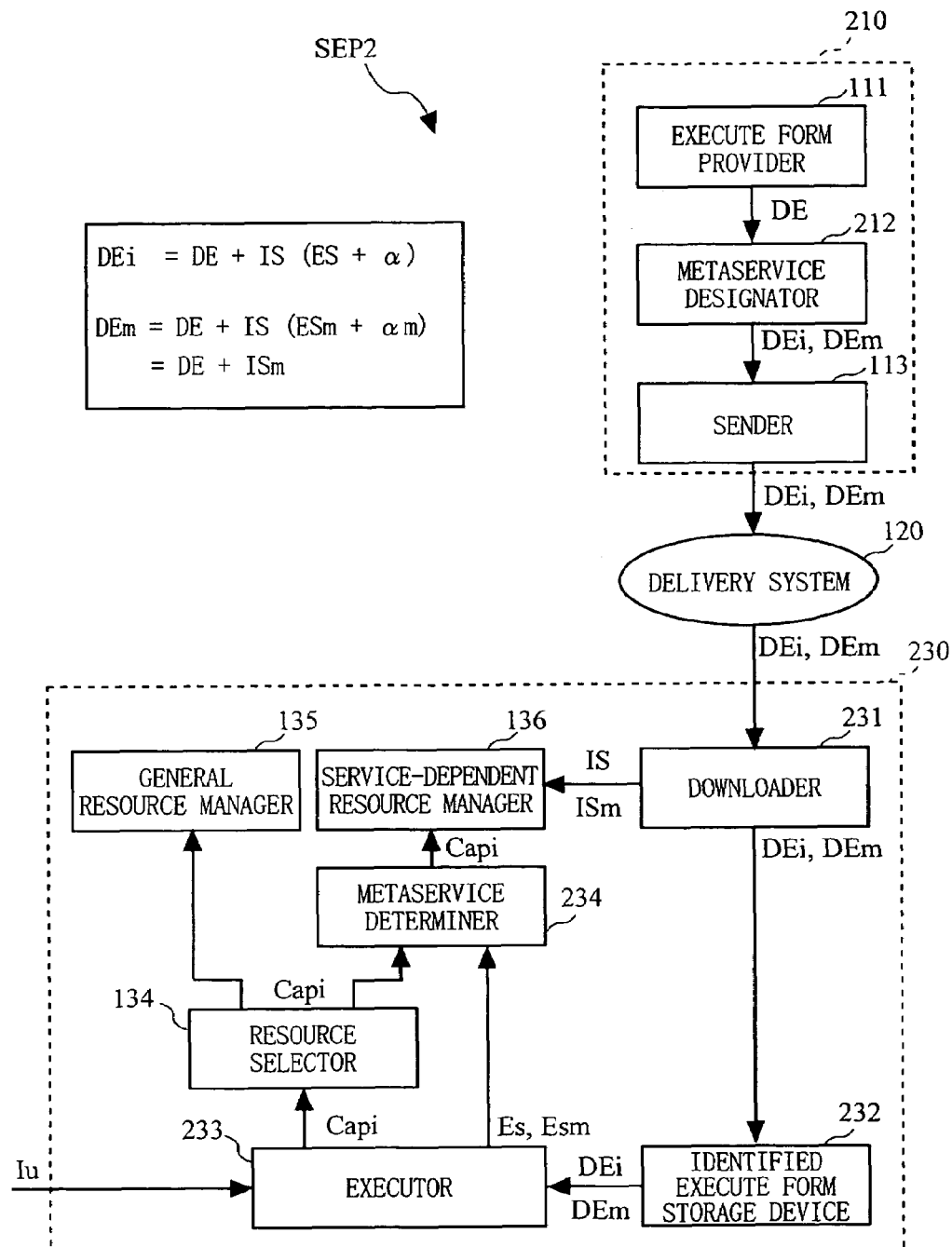
FIG. 8 is a block diagram schematically showing the structure of a safe service extension platform according to a second embodiment of the present invention.

Hereinafter, referring to FIGS. 8, 9, and 11, a safe service extension platform according to a second embodiment of the present invention is described. As shown in FIG. 8, a safe service extension platform SEP2 according to the present embodiment is such that the service provision source 110 of the safe service extension platform SEP1 shown in FIG. 1 is changed to a service provision source 210, and the terminal device 130 is changed to a terminal device 230.

The service provision source 210 is such that the service identification setter 112 of the service provision source 110 is replaced with a metaservice designator 212. The terminal device 230 is such that the executor 133 of the terminal device 130 is replaced with an executor 233, and a metaservice determiner 234 is additionally provided between the resource selector 134 and the service-dependent resource manager 136.

The terminal device 230 is such that the downloader 131 of the terminal device 130 according to the first embodiment is replaced with a downloader 231, the identified execute form storage device 132 is replaced with an identified execute form storage device 232, the executor 133 is replaced with the executor 233, and the metaservice determiner 234 is additionally provided between the resource selector 134 and the service-dependent resource manager 136.

In the service provision source 210, the metaservice designator 212 is such that the above-described service identification setter 112 is provided with a metaservice designation information generation function. Specifically, similar to the service identification setter 112, the metaservice designator 212 generates associated information IS which indicates a subsidiary matter, such as an attribute of execute form DE, and also generates metaservice designation information ISm for designating an execute form DE that is to be associated with a metaservice.

The metaservice is the only one of the above services in which it is possible to carry out service extension, such as changing of service functions/features, e.g., the start/end of the use of the service actually used by the user, and addition of a new service. The metaservice exists for the purpose of the service extension. In this context, herein, the service So as described in the first embodiment and metaservice Smeta of the present embodiment are distinguished from each other.

Associated information IS is added to execute form DE to generate identified execute form DEi, and metaservice designation information ISm is added to the execute form DE to generate metaservice execute form DEm. Specifically, the identified execute form DEi and the metaservice execute form DEm are collectively outputted from the metaservice designator 212. Then, the identified execute form DEi and the metaservice execute form DEm are inputted to the terminal device 230 via the sender 113 and the delivery system 120.

Then, the downloader 231 of the terminal device 230 outputs the identified execute form DEi and the metaservice execute form DEm to the identified execute form storage device 232. Then, the downloader 231 extracts the associated information IS from the identified execute form DEi, and also extracts metaservice designation information ISm from the metaservice execute form DEm, and they are outputted to the service-dependent resource manager 236.

Figure 9:
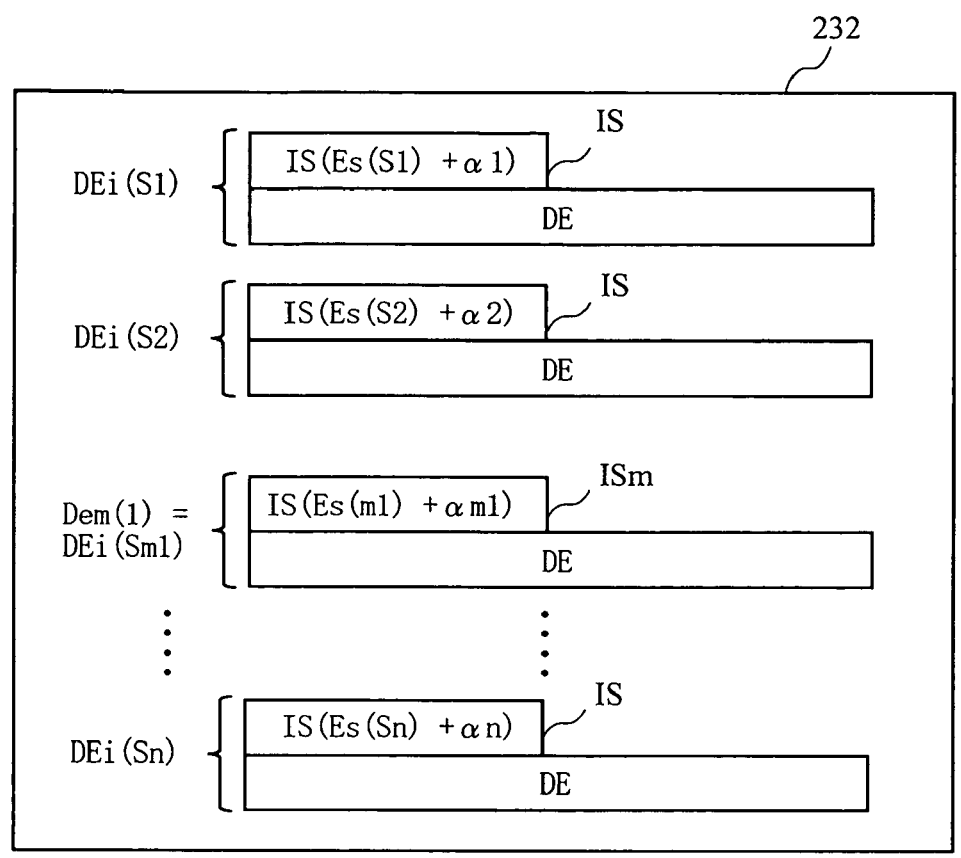
FIG. 9 is a diagram for explaining an identified execute form and a metaservice execute form which are stored in an identified execute form storage device of the safe service extension platform shown in FIG. 8.

FIG. 9 shows how the identified execute form DEi and the metaservice execute form DEm, which are outputted from the metaservice designator 212, are stored in the identified execute form storage device 232. In the example shown in FIG. 9, as in the first embodiment shown in FIG. 2, identified execute form DEi (S1), DEi (S2), and DEi (Sn) respectively corresponding to service S1, and services S2 through Sn (where n is an arbitrary natural number) are illustrated. Note that in FIG. 9, the first metaservice execute form DEm(1) is shown in the position for identified execute form DEi (S3) corresponding to service S3. The metaservice execute form DEm(1) is such that an execute form DE is assigned with metaservice designation information ISm (1) which indicates that the execute form corresponds to a metaservice.

The metaservice execute form DEm(1) includes metaservice designation information ISm consisting of service identification information Es (Sm1) and subsidiary information $\alpha$m1, each of which corresponds to metaservice m1, and it also includes an execute form DE. Specifically, the service identification information Es (Sm1) associates the execute form DE with metaservice 1. As such, except that "Sm1" of the service identification information Es (Sm1) defines the metaservice 1, the metaservice designation information ISm is basically the same as the associated information IS.

Specifically, as described above, the metaservice Sm is one of the services Sn, therefore the metaservice execute form DEm can also be represented by identified execute form DEi(Sm). Accordingly, the metaservice designation information ISm may be referred to by the generic name "associated information IS", but for the purpose of clarifying the feature of the present embodiment, herein, the metaservice designation information ISm is distinguished from the associated information IS. Further, the service identification information Es corresponding to a metaservice is referred to as "metaservice identification information Esm so as to be distinguished from the service identification information Es corresponding to the execute form DE.

The operation of the identified execute form storage device 232 is basically the same as that of the identified execute form storage device 132 as described above in the first embodiment. However, it should be noted that the identified execute form storage device 232 stores the identified execute form DEi and the metaservice execute form DEm, and in response to a demand, the identified execute form DEi or the metaservice execute form DEm is outputted to the executor 233.

The executor 233 extracts the service identification information Es from the identified execute form DEi, and also extracts the service identification information Esm from the metaservice execute form DEm, and they are outputted to the metaservice determiner 234.

The metaservice determiner 234 outputs API call Capi to the service-dependent resource manager 136 based on the API call Capi inputted from the resource selector 134, and the service identification information Es and the service identification information Esm, which are inputted from the executor 233, only when the execute form DE that is being executed is associated with the metaservice.

The service-dependent resource manager 136 stores service-dependent resource RS, and manages the service-dependent resource RS by the service-dependent resource management table Trs. Note that the service-dependent resource RS stored in the service-dependent resource manager 136 and the service-dependent resource management table Trs therefore may be the same as those described in the first embodiment with reference to FIG. 3.

Then, in response to the API call Capi inputted via the metaservice determiner 234, for example, the service-dependent resource manager 136 references or operates the service-dependent resource RS stored in the service-dependent resource manager 136. Also, it recognizes the details of services to which the execute forms DE correspond, based on the associated information IS provided from the downloader 231.

In the addition of a new service, at the time the service-dependent resource manager 136 detects the presence of a new service which is not registered in the service-dependent resource management table Trs, based on the associated information IS and the metaservice designation information ISm which are inputted from the downloader 231, an identification row for that service is added and the details thereof are written therein. Specifically, in the service-dependent resource management table Trs, the details of the metaservice are written in column C1, but if focusing only on the procedure of adding the service identification row, the details of a process are the same as those in the first embodiment.

Figure 10:
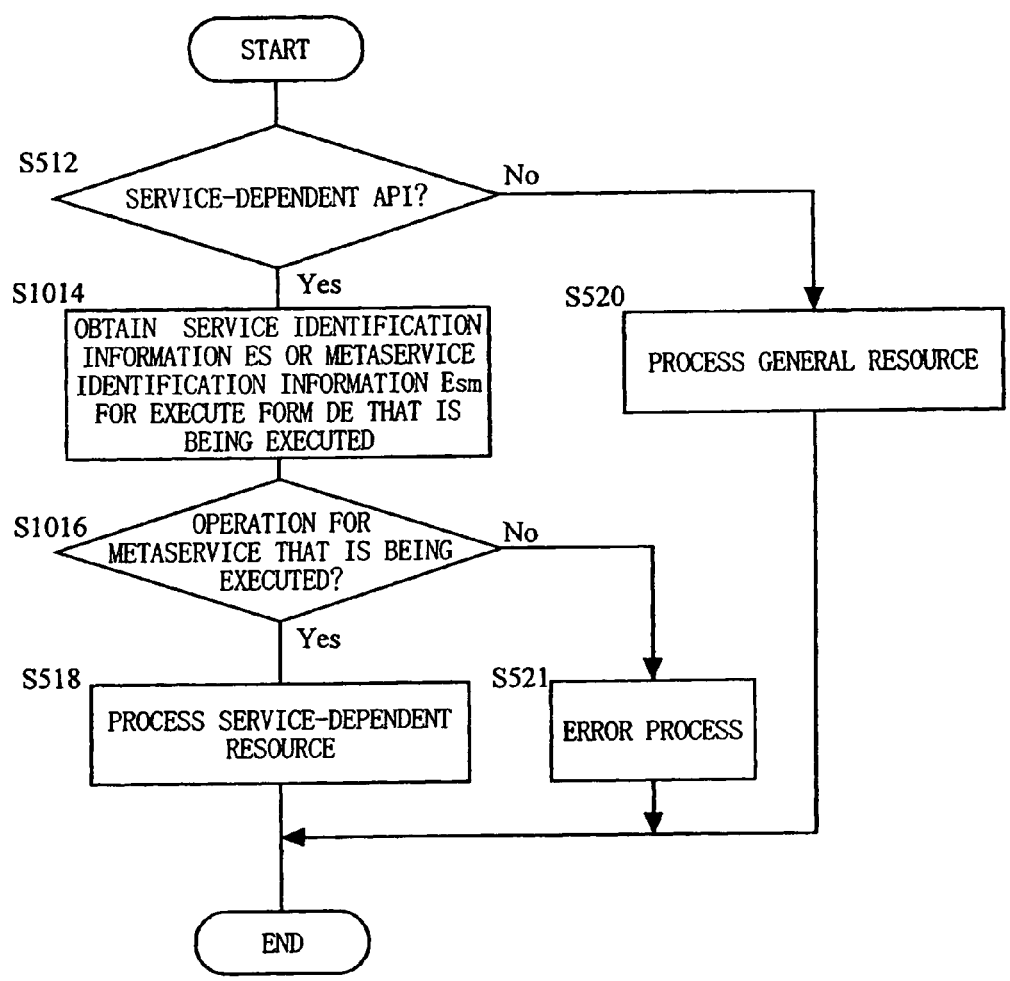
FIG. 10 is a flowchart showing a service execution operation by a terminal device of the safe service extension platform shown in FIG. 8.

Next, referring to a flowchart shown in FIG. 10, an operation of a service execution routine by the terminal device 230 is described. Specifically, in the terminal device 230, the service execution is realized by executing an execute form DE corresponding to an API called by the executor 233. Specifically, the procedure of the present routine starts at the time the executor 233 issues an API call Capi in order to implement execute forms DE contained in identified execute form DEi and metaservice execute form DEm, which are inputted from the identified execute form storage device 232.

Note that the structure of the flowchart shown in FIG. 10 is similar to that of the flowchart shown in FIG. 5 except that the "OBTAIN SERVICE IDENTIFICATION INFORMATION ES FOR EXECUTE FORM DE THAT IS BEING EXECUTED" step S514 is replaced with the "OBTAIN SERVICE IDENTIFICATION INFORMATION ES OR SERVICE IDENTIFICATION INFORMATION Esm FOR EXECUTE FORM DE THAT IS BEING EXECUTED" step S1014, and the "DETERMINE WHETHER IT IS OPERATION FOR SERVICE THAT IS BEING EXECUTED?" step S516 is replaced with the "DETERMINE WHETHER IT IS-OPERATION FOR METASERVICE THAT IS BEING EXECUTED?" step S1016. The descriptions given below mainly focus on the operation unique to the present embodiment.

At step S512, if the resource selector 134 determines, based on API call Capi issued by the executor 233, that a called API is a service-dependent API, then the procedure proceeds to step S1014.

At step S1014, the metaservice determiner 234 reads, from the executor 233, service identification information Es or metaservice identification information Esm corresponding to the execute form DE that is currently being executed, and the procedure proceeds to the next step S1016.

At step S1016, it is determined whether the execute form DE that is being executed is associated with the metaservice. In the case of "No", the present routine is terminated after the above-described error process step S521. On the other hand, if the execute form DE that is being executed is associated with the metaservice, "Yes" is assumed, the procedure proceeds to the "PROCESS SERVICE-DEPENDENT RESOURCE" step S518, and thereafter the present routine is terminated.

Note that in the case of the execute form DE of the metaservice that is being executed (Yes at step S1016), service-dependent resources for all services are processed at step S518.

As described above, in the second embodiment, if the execute form DE is the metaservice, then service-dependent APIs for all services can be executed. Accordingly, a list of services available from the service provision portion is displayed in the window of the execute form DE of the metaservice, and the service extension, such as changing of a service function/feature or an addition of a new service, is achieved on the displayed list.

THIRD EMBODIMENT

Figure 11:
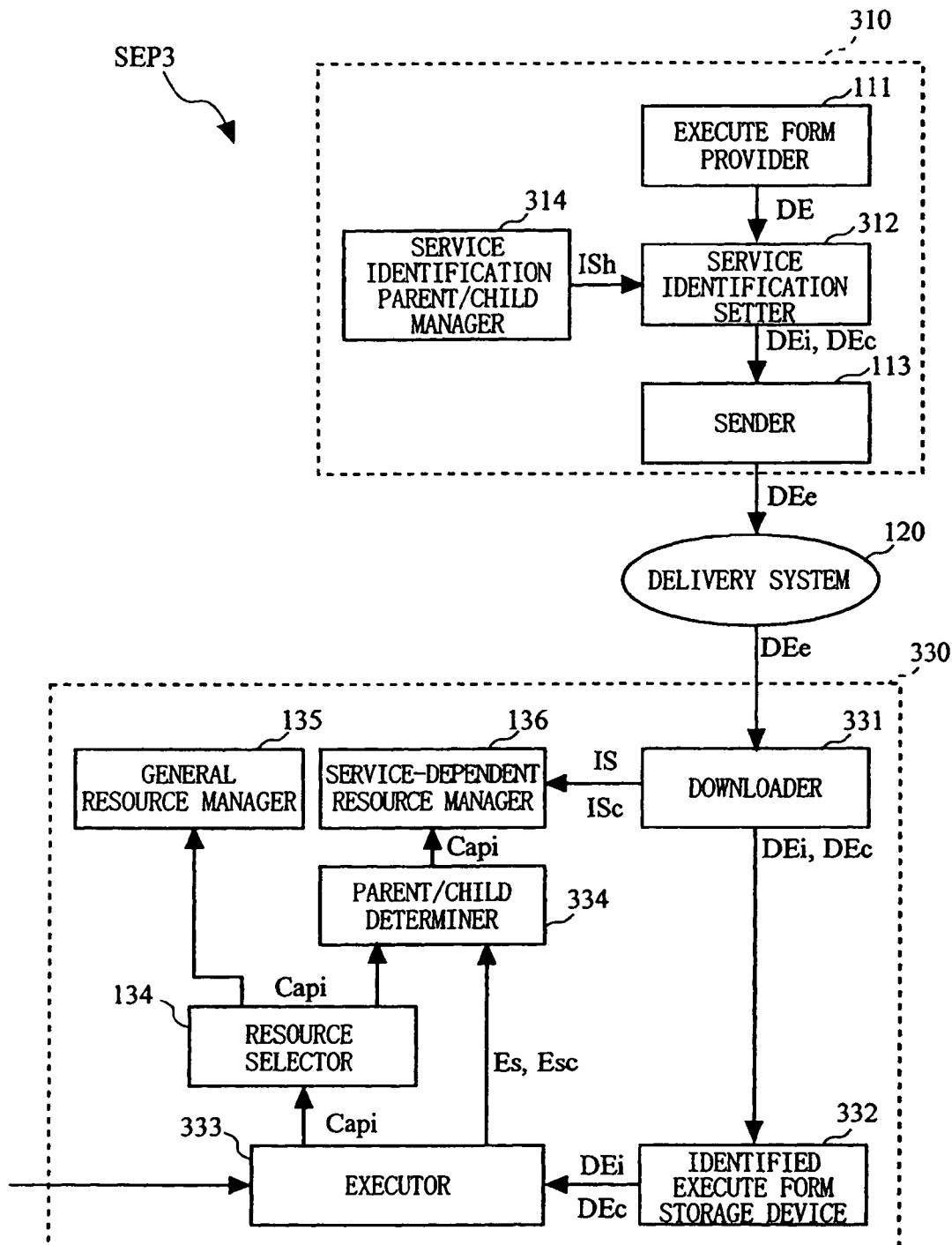
FIG. 11 is a block diagram schematically showing the structure of a safe service extension platform according to a third embodiment of the present invention.
Figure 12:
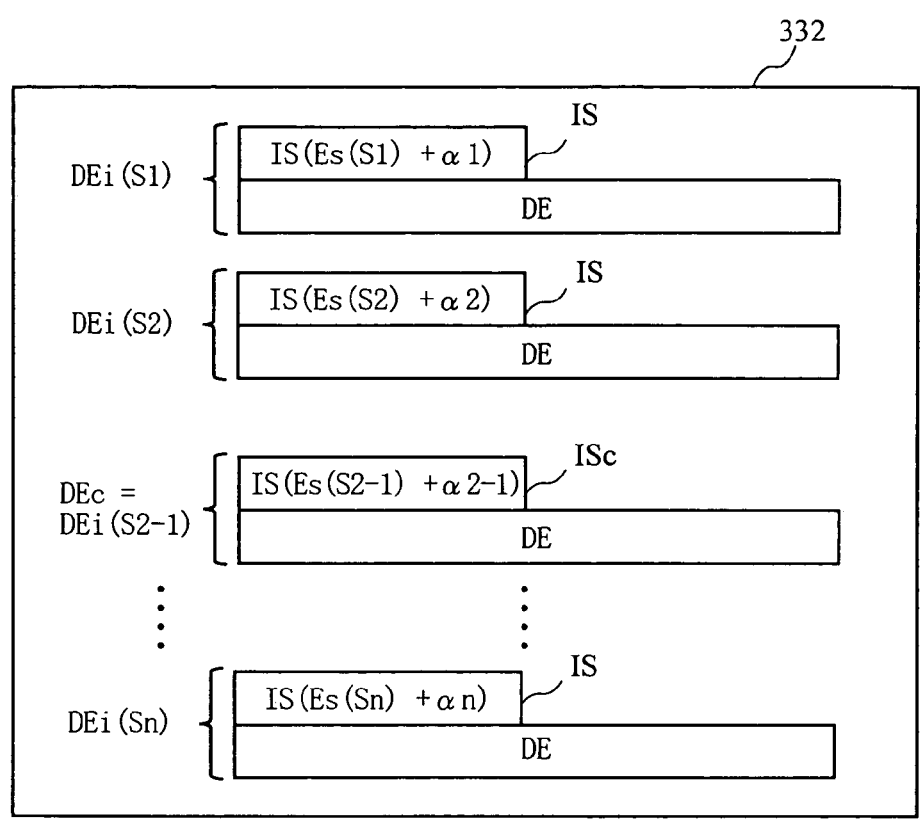
FIG. 12 is a diagram for explaining an identified execute form and a parent/child identified execute form which are stored in an identified execute form storage device of the safe service extension platform shown in FIG. 11.
Figure 13:
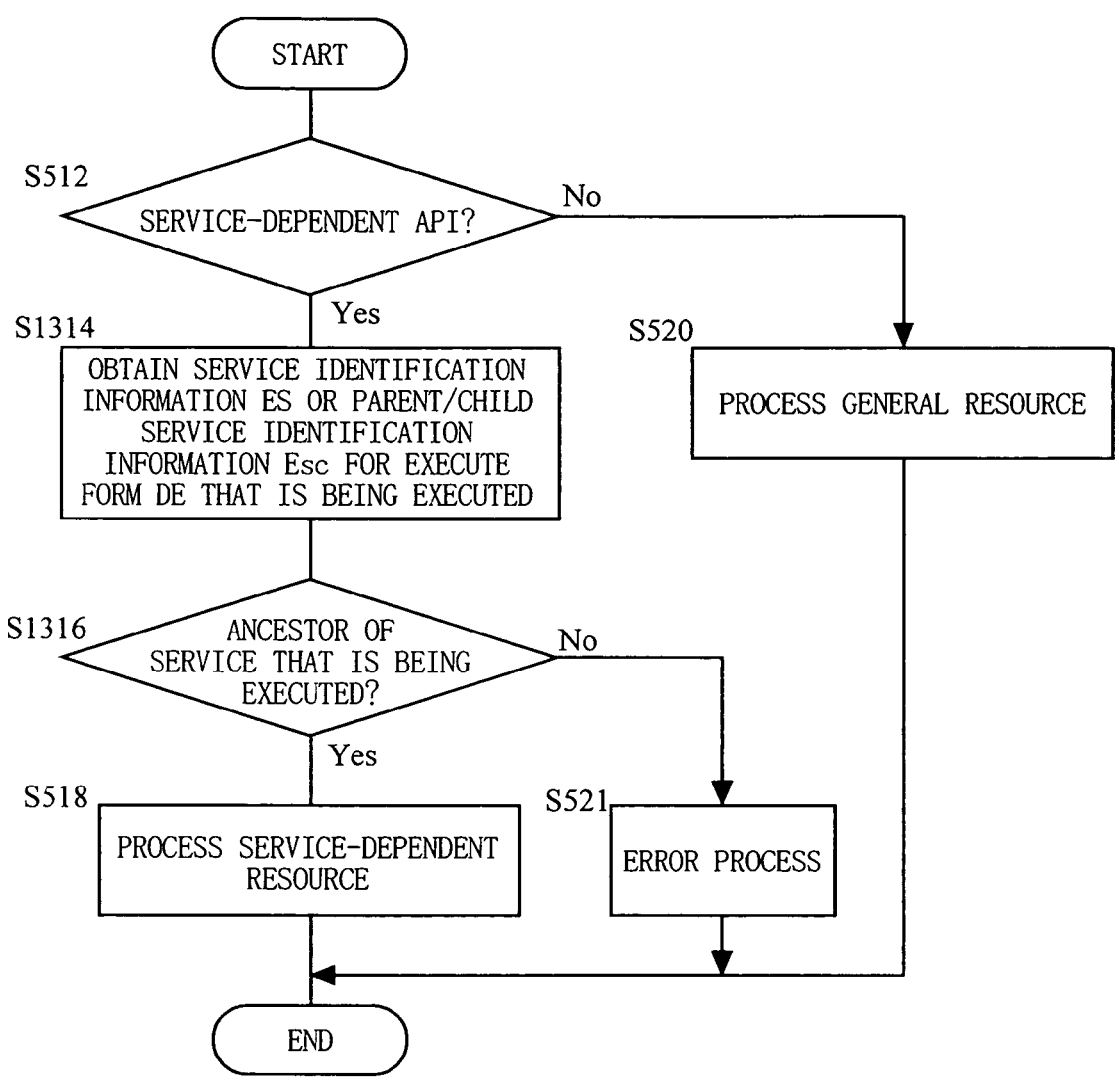
FIG. 13 is a flowchart showing a service execution operation by a terminal device of the safe service extension platform shown in FIG. 11.
Figure 14:
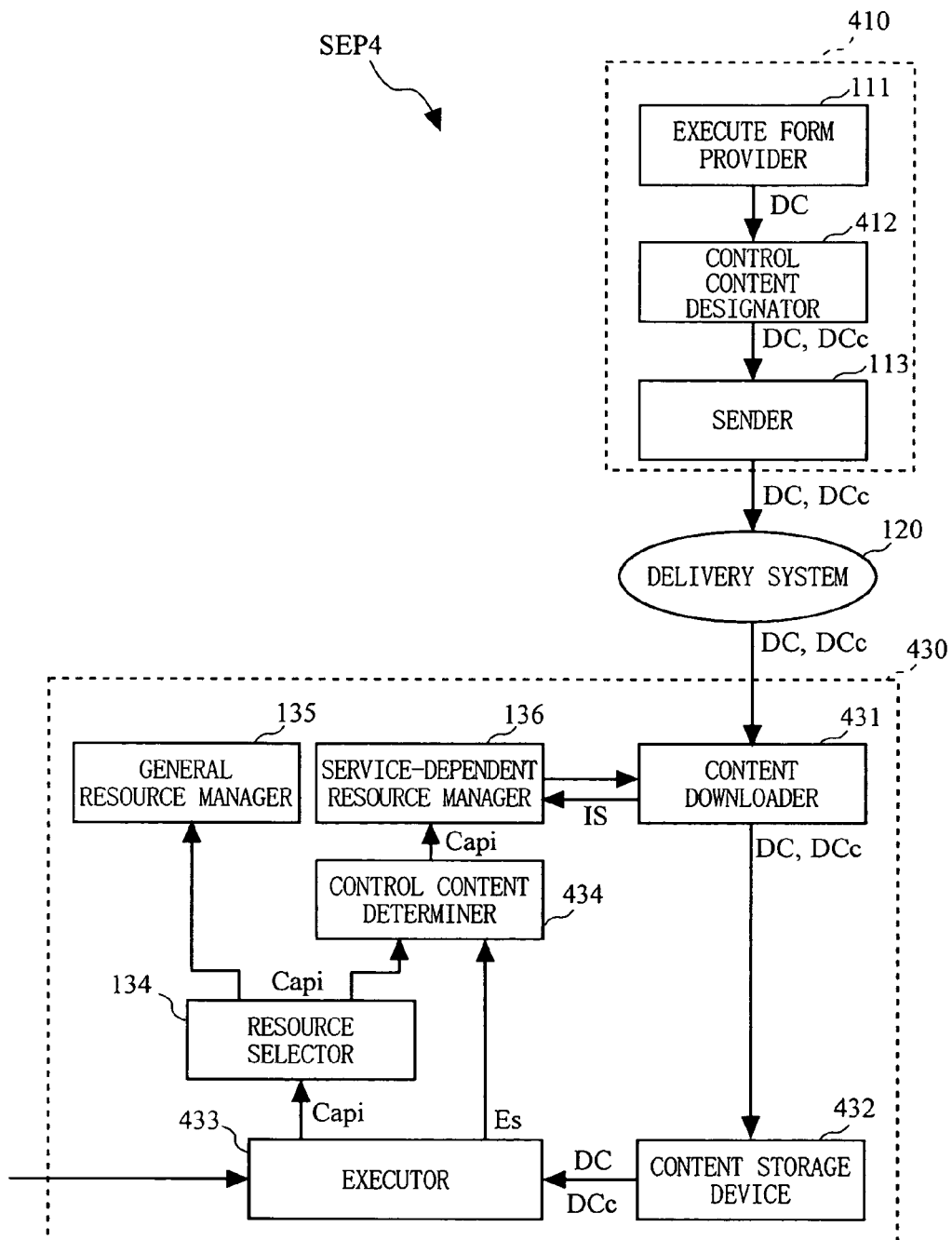
FIG. 14 is a block diagram schematically showing the structure of a safe service extension platform according to a fourth embodiment of the present invention.

Next, referring to FIGS. 11, 12, and 13, a safe service extension platform according to a third embodiment of the present invention is described in detail. As shown in FIG. 11, a safe service extension platform SEP3 according to the present embodiment is such that the service provision source 110 of the safe service extension platform SEP1 shown in FIG. 1 is changed to a service provision source 310, and the terminal device 130 is changed to a terminal device 330.

The service provision source 310 is such that the service identification setter 112 of the service provision source 110 is replaced with a service identification setter 312, and a service identification parent/child manager 314 is additionally provided. In the case where there are parent/child relationships between separate services, the service identification parent/child manager 314 manages such relationships as parent/child relationships between pieces of identification information Es. Further, service parent/child designation information ISh which indicates managed parent/child relationships is outputted to the service identification setter 312.

The terminal device 330 is such that the downloader 131 of the terminal device 130 is replaced with a downloader 331, the identified execute form storage device 132 is replaced with an identified execute form storage device 332, the executor 133 is replaced with an executor 333, and a parent/child determiner 334 is additionally provided between the resource selector 134 and the service-dependent resource manager 136.

In the service provision source 310, a parent/child relationship between services managed by the service identification parent/child manager 314 is defined as a relationship in which a service-dependent resource Rs of a child service can be operated by a parent service. Note that as the necessity arises, the names "parent service Sp", "child service Sc", and "service-dependent resource RSc of the parent service" are used to identify each of them. For example, for a parent service corresponding to the service category "music content distribution service", there are child services corresponding to individual service types, such as a "Matsushita music distribution service", a "Teichiku music distribution service", and an "ep-channel music service".

The service identification setter 312 is such that the above service identification setter 112 is provided with a parent/child service identification information generation function. Specifically, similar to the service identification setter 112, the service identification setter 312 generates associated information IS which indicates a subsidiary matter, such as an attribute of execute form DE. Further, based on service parent/child information Ih supplied from the service identification parent/child manager 314, the service identification setter 312 generates service parent/child information Esc. For example, service parent/child designation information ISh (S1-1) is generated based on the service parent/child information Ih. Service parent/child information Esc(S1-1) defines that the service is a child service of parent service S1.

The associated information IS is added to the execute form DE to generate an identified execute form DEi, and the service parent/child designation information ISh is added to the execute form DE to generate a parent/child identified execute form DEc. Specifically, the identified execute form DEi and the parent/child identified execute form DEc are collectively outputted from the service identification setter 312. Then, the identified execute form DEi and the parent/child identified execute form DEc are inputted to the terminal device 330 via the sender 113 and the delivery system 120. Then, the downloader 331 of the terminal device 330 outputs the identified execute form DEi and the parent/child identified execute form DEc to the identified execute form storage device 332. Further, the downloader 331 extracts the associated information IS from the identified execute form DEi, and extracts the service parent/child designation information ISh from the parent/child identified execute form DEc, and they are outputted to the service-dependent resource manager 136.

FIG. 12 shows how the identified execute form DEi and the parent/child identified execute form DEc, which are outputted from the service identification setter 312, are stored in the identified execute form storage device 332. In the example shown in the figure, as in the first embodiment shown in FIG. 2, identified execute forms DEi (S1), DEi (S2), and DEi (Sn) respectively corresponding to service S1, and services S2 through Sn (where n is an arbitrary natural number) are illustrated. Note that in FIG. 12, the first parent/child identified execute form DEc(1) is shown in the position for identified execute form DEi(S3) corresponding to service S3. The parent/child identified execute form DEc(1) is such that an execute form DE is assigned with service parent/child designation information ISh which indicates that the execute form corresponds to a child service.

The parent/child identified execute form DEc(1) includes service parent/child designation information ISh(1) consisting of service identification information Es(Sc1) and subsidiary information αc1, each of which corresponds to parent service Sp1, and it also includes an execute form DE. Specifically, the parent/child service identification information Esc associates the execute form DE with child service Sc1 corresponding to the parent service Sp1. As such, the service parent/child designation information ISh is basically the same as the associated information IS except that "Sp1" of the service identification information Es(Sp1) defines child service 1.

Specifically, as described above, the child service Sc is one of the services Sn, therefore the parent/child identified execute form DEc can also be represented by identified execute form DEi (Sc). Accordingly, the service parent/child designation information ISh may be referred to by the generic name "associated information IS", but for the purpose of clarifying the feature of the present embodiment, herein, the service parent/child designation information ISh is distinguished from the associated information IS. Further, the service identification information Es which defines the child service Sc corresponding to the parent service Sp is referred to as "parent/child service identification information Esc" so as to be distinguished from the service identification information Es corresponding to the execute form DE.

The operation of the identified execute form storage device 332 is basically the same as that of the identified execute form storage device 132 as described above in the first embodiment. Note that the identified execute form storage device 332 stores the identified execute form DEi and the parent/child identified execute form DEc, and in response to a demand, the identified execute form DEi or the parent/child identified execute form DEc is outputted to the executor 333.

The executor 333 extracts the service identification information Es from the identified execute form DEi, and also extracts the parent/child service identification information Esc from the parent/child identified execute form DEc, and they are outputted to the parent/child determiner 334.

The parent/child determiner 334 outputs API call Capi to the service-dependent resource manager 136 based on the API call Capi inputted from the resource selector 134, and the service identification information Es and the parent/child service identification information Esc, which are inputted from the executor 333, only when the execute form DE that is being executed is an ancestor (a parent, a parent's parent, a parent's parent's parent, . . . ) of the service for the service-dependent resource targeted for processing by the API call Capi.

Specifically, the parent/child determiner 334 obtains, from the executor 333, the parent/child service identification information Esc for the execute form DE that is being executed, and also obtains the API call Capi issued by the executor 333 via the resource selector 134. Further, the service parent/child designation information ISh which is information for determining a parent/child relationship between services is obtained from the downloader 331. Then, it is determined whether the service indicated by the parent/child service identification information Esc is an ancestor of the service indicated by the service parent/child designation information ISh. Then, if it is determined to be the ancestor, the service-dependent resource manager 136 is notified of a request to call the service-dependent API (API call Capi), while no notification is given if it is determined not to be the ancestor.

Next, referring to a flowchart shown in FIG. 13, an operation of a service execution routine by the terminal device 330 is described. Specifically, the procedure of the present routine starts at the time the executor 333 in the terminal device 330 issues an API call Capi in order to execute an execute form DE corresponding to an API that is to be called and an execute form DE contained in the parent/child identified execute form DEc.

Note that the structure of the flowchart shown in FIG. 13 is similar to that of the flowchart shown in FIG. 5 except that the "OBTAIN SERVICE IDENTIFICATION INFORMATION ES FOR EXECUTE FORM DE THAT IS BEING EXECUTED" step S514 is replaced with the "OBTAIN SERVICE IDENTIFICATION INFORMATION ES OR PARENT/CHILD SERVICE IDENTIFICATION INFORMATION Esc FOR EXECUTE FORM DE THAT IS BEING EXECUTED" step S1314, and the "DETERMINE WHETHER IT IS OPERATION FOR SERVICE THAT IS BEING EXECUTED?" step S516 is replaced with the "DETERMINE WHETHER IT IS OPERATION OF METASERVICE THAT IS BEING EXECUTED?" step S1316. The descriptions given below mainly focus on the operation unique to the present embodiment.

At step S512, if the resource selector 134 determines, based on API call Capi issued by the executor 333, that a called API is a service-dependent API, then the procedure proceeds to step S1314.

At step S1314, the parent/child determiner 334 reads, from the executor 333, service identification information Es or parent/child service identification information Esc, which corresponds to the execute form DE that is currently being executed, and the procedure proceeds to the next step S1316.

At step S1316, the parent/child determiner 334 determines whether the service corresponding to the execute form DE that is being executed is an ancestor service of a service corresponding to the service-dependent resource that is targeted for processing by the service-dependent API call Capi. In the case of "No", the present routine is terminated after the above-described error process step S521. On the other hand, if the execute form DE that is being executed is an ancestor of the service that is being executed, "Yes" is assumed, and the present routine ends after the procedure proceeds to the "PROCESS SERVICE-DEPENDENT RESOURCE" step S518.

Note that at step S518, the service-dependent resource manager 136 processes the service-dependent resource corresponding to the service-dependent API call Capi. Specifically, it is so managed that a service-dependent resource for an offspring (a child, a child's child, a child's child's child, etc. . . . ) of a service of the execute form DE that is currently being executed can be processed.

FOURTH EMBODIMENT

Next, referring to FIGS. 14, 15, 16, and 17, a safe service extension platform according to a fourth embodiment of the present invention is described. As shown in FIG. 8, a safe service extension platform SEP4 according to the present embodiment is such that the service provision source 110 of the safe service extension platform SEP1 shown in FIG. 1 is changed to a service provision source 410, and the terminal device 130 is changed to a terminal device 430.

The service provision source 410 is such that the execute form provider 111 of the service provision source 110 is replaced with a content provider 411, and the service identification setter 112 is replaced with a control content designator 412. The terminal device 430 is such that the downloader 131 of the terminal device 130 is replaced with a content downloader 431, the identified execute form storage device 132 is replaced with a content storage device 432, the executor 133 is replaced with an executor 433, and a control content determiner 434 is additionally provided between the resource selector 134 and the service-dependent resource manager 136.

The content provider 411 stores execute form DE, which implements a service, and content DC, which is data generated so as to be interpreted by the execute form DE and presented to the user, and they are outputted on demand. The execute form DE meets requirements that are to be satisfied by the content DC. For example, both the execute form DE and the content DC are written in markup language which can include a script description for programming sequential operation procedures. The script language may be a language such as Java (R)-based JavaScript or ECMAScript. Also, the markup language may be an HTML language or a BML language.

The control content designator 412 assigns associated information ISC indicative of control content to a control content from among contents DC outputted from the content provider 411, and outputs it as control content DCc. The control content DCc is defined as being content DC generated as an execute form DE associated with a service.

The content downloader 431 receives the content DC and the control content DCc, which are transmitted from the delivery system 120, and writes the received information into the content storage device 432.

Since the delivery system 120 transmits the execute form DE as a kind of content DC, the content downloader 431 may have a function of storing the content DC.

The content downloader 431 controls content storage based on information held as a service-dependent resource in the service-dependent resource manager 136 and indicating whether to automatically download service content.

Specifically, in the case where a target service should be automatically downloaded, the content downloader 431 stores all content DC related to that service, including the control content DCc. On the other hand, in the case where it should not be automatically downloaded, only the control content DCc is stored.

The content storage device 432 stores the content DC. While information stored in the identified execute form storage device 132 as described in the first embodiment is the execute form DE, the content storage device 432 stores the content DC. Note that the content DC includes the control content DCc.

Figures 15, 16:
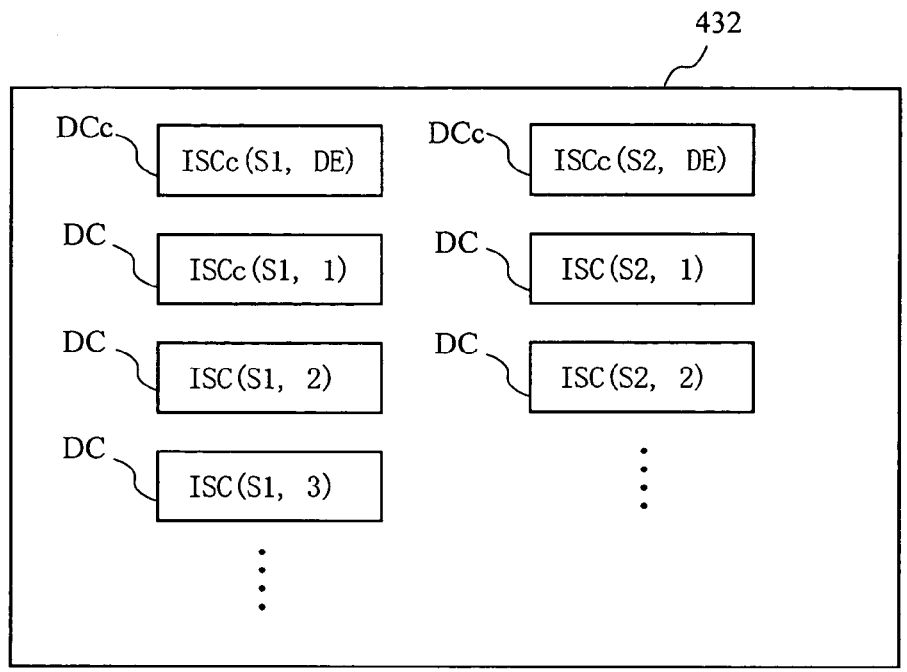
FIG. 15 is a diagram for explaining a control content and a content which are stored in a content storage device of the safe service extension platform shown in FIG. 14.
FIG. 16 is a diagram for explaining a service-dependent resource management table managed in a service-dependent resource manager of the safe service extension platform shown in FIG. 14.

FIG. 15 shows how the content DC outputted from the control content designator 412 and the associated information ISC are stored in the content storage device 432. In the example shown in FIG. 15, for service S1, C(S1,DE), which is a control content DCc, and C(S1,1), C(S1, 2), and C(S1, 3), which are contents DC, are held in the content storage device 432. C(S1,E) which is the control content DCc is executed by the executor 433, such that C(S1,1), C(S1, 2), and C(S1, 3), which are the contents DC, are read and presented to the user. Specifically, C(S1,DE) which is a control content DCc operates in a manner equivalent to a so-called browser for C(S1,1), C(S1,2), and C(S1,3) which are the contents DC.

The control content determiner 434 determines, based on an output of the executor 433, whether the content DC that is being executed is the control content DCc. Then, only in the case of the control content DCc, a request for a service-dependent API from the resource selector 134 is transmitted to the service-dependent resource manager 136.

FIG. 16 is an exemplary service-dependent resource table Trs4 stored in the service-dependent resource manager 136 in the present embodiment. Although the service-dependent resource table Trs4 is similar to the service-dependent resource management table Trs for the first embodiment shown in FIG. 3, column C2 holds, for each service, information which indicates whether the content downloader 431 should automatically download content DC.

Figure 17:
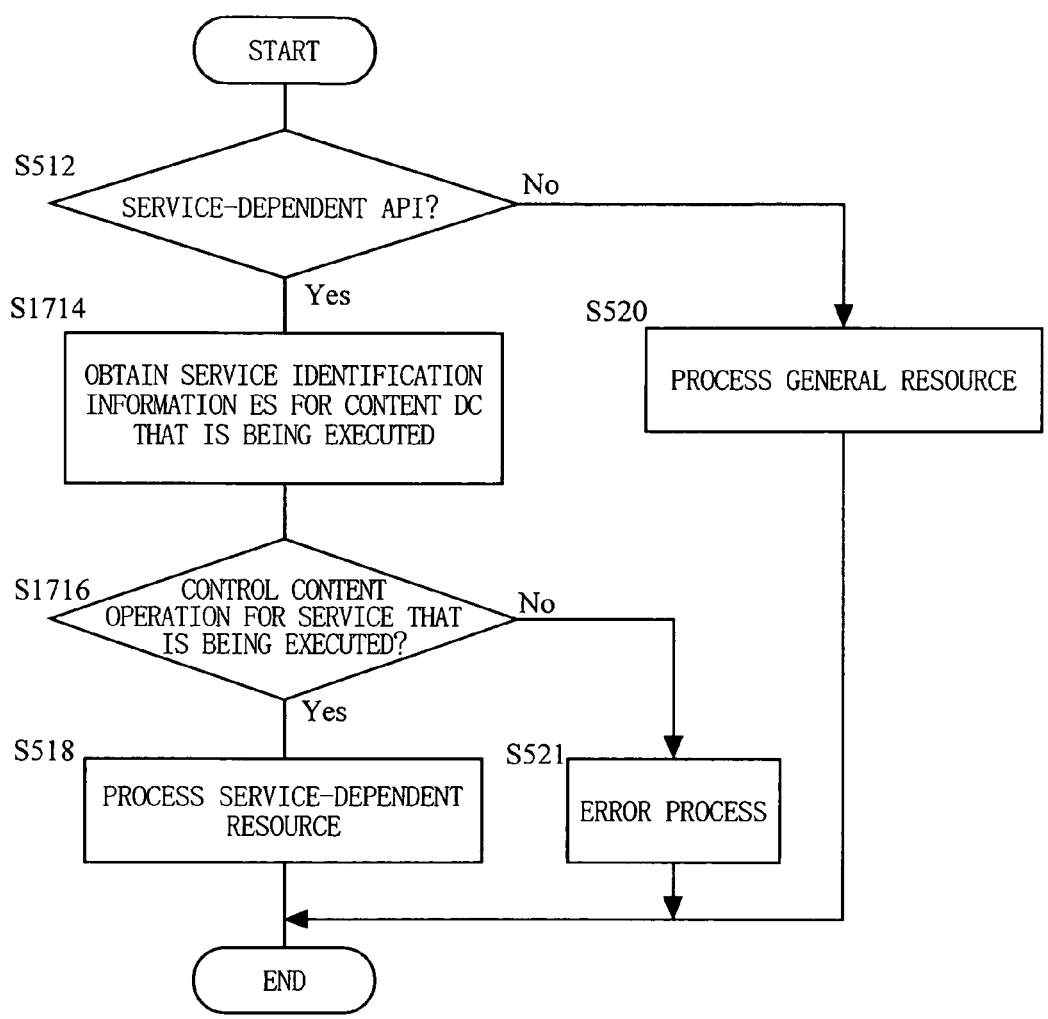
FIG. 17 is a flowchart showing a control content execution operation by a terminal device of the safe service extension platform shown in FIG. 14.
Figure 18:
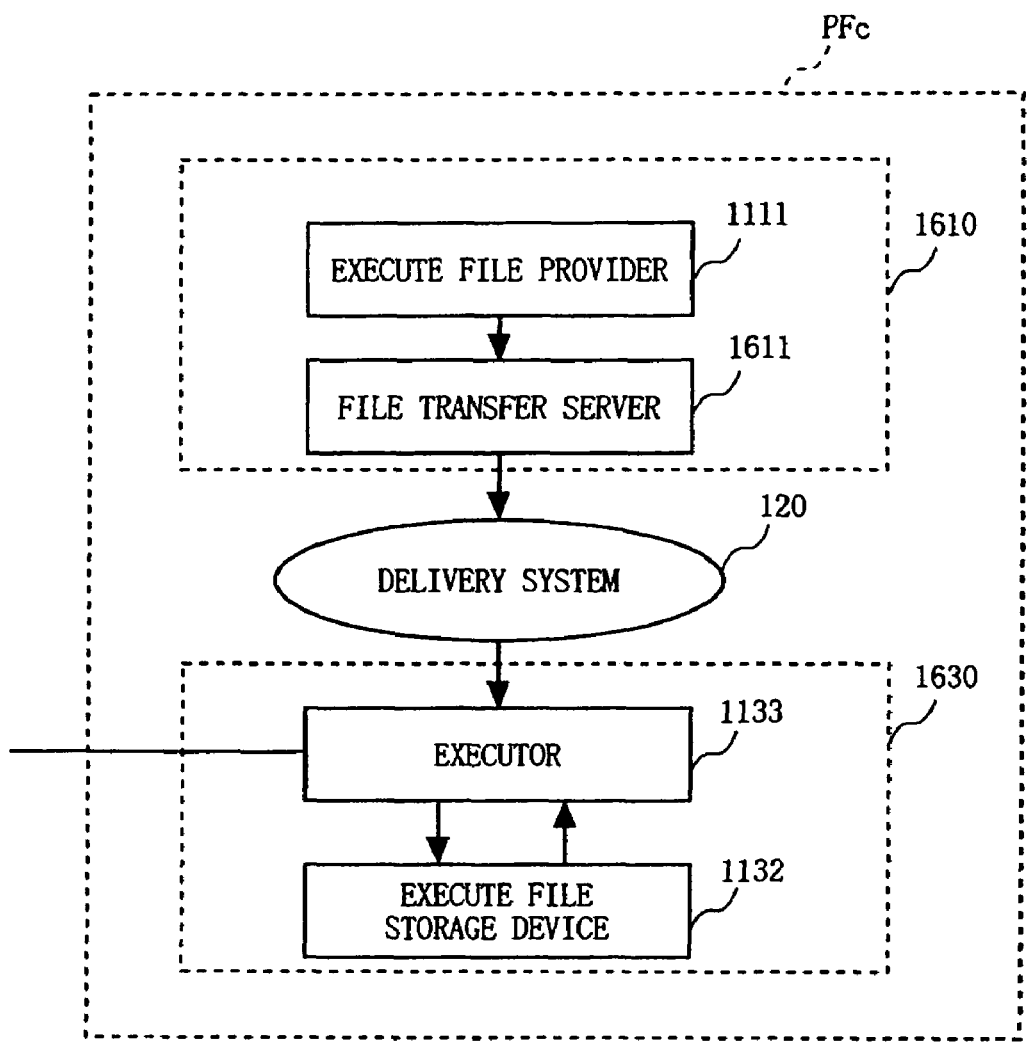
FIG. 18 is a block diagram schematically showing the structure of a conventional service platform in conventional art.
Figure 19:
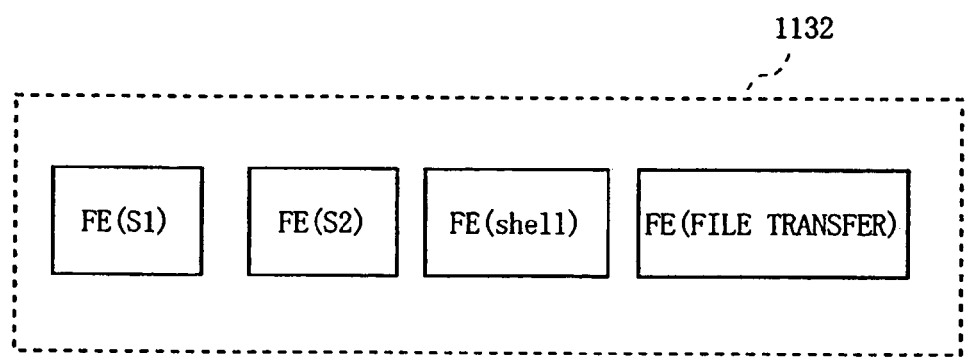
FIG. 19 is a diagram for explaining an execute file stored in an execute file storage device of the service platform shown in FIG. 18.
Figure 20:
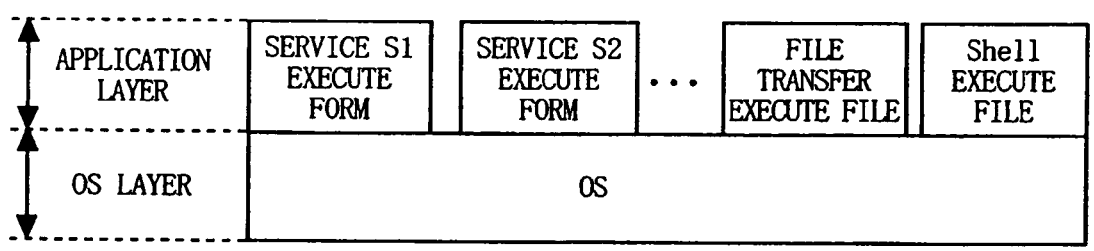
FIG. 20 is a diagram for explaining a software hierarchy of a terminal device of the service platform shown in FIG. 18.

Next, referring to a flowchart shown in FIG. 17, an operation of a routine of executing control content DCc by the terminal device 430 is described. Specifically, the procedure of the present routine starts at the time the executor 433 in the terminal device 430 issues API call Capi in order to execute control content DCc for an API that is to be called.

Note that the structure of the flowchart shown in FIG. 17 is similar to that of the flowchart shown in FIG. 5 except that the "OBTAIN SERVICE IDENTIFICATION INFORMATION ES FOR EXECUTE FORM DE THAT IS BEING EXECUTED" step S514 is replaced with the "OBTAIN SERVICE IDENTIFICATION INFORMATION ES FOR CONTENT DC THAT IS BEING EXECUTED" step S1714, and the "DETERMINE WHETHER IT IS OPERATION FOR SERVICE THAT IS BEING EXECUTED?" step S516 is replaced with the "DETERMINE WHETHER IT IS CONTROL CONTENT OPERATION FOR SERVICE THAT IS BEING EXECUTED?" step S1716. The descriptions given below mainly focus on the operation unique to the present embodiment.

At step S512, if the resource selector 134 determines, based on API call Capi issued by the executor 433, that a called API is a service-dependent API, then the procedure proceeds to step S1714.

At step S1714, the control content determiner 434 reads, from the executor 433, service identification information Es for the content DC that is currently being executed, and the procedure proceeds to the next step S1716.

At step S1716, the control content determiner 434 determines whether the content DC that is being executed is a control content corresponding to a service to which the content DC corresponds and which corresponds to the service-dependent resource that is targeted for processing by the service-dependent API call Capi. In the case of "No", the present routine is terminated after the above-described error process step S521. On the other hand, if the content DC that is being executed is an ancestor of the service that is being executed, "Yes" is assumed, and the present routine ends after the procedure proceeds to the "PROCESS SERVICE-DEPENDENT RESOURCE" step S518.

Note that at step S518, the service-dependent resource manager 136 processes the service-dependent resource corresponding to the service-dependent API call Capi.

According to the safe service extension platform disclosed herein, it is possible to realize new dimensional safety in which false access by execute form DE which implements a service can be eliminated without the need to deny that a process which might cause the false access is included in the execute form DE.

Specifically, it is possible to eliminate false access which is a process causing behavior with adverse effects on normal service reception, such as a change of the status of another service, data corruption, a system down of the platform itself, without the need to infer from the authenticity of the distributor of the execute form DE that the execute form DE includes a process which might cause false access.

Further, in addition to the above described nature, it is possible to change or add the execute form DE to implement a function which achieves service extension, such as a change of a service function/feature or addition of a new service.

Thus, it is possible to simultaneously realize unprecedented new dimensional safety and operability in a conventional platform which can extend a service.

INDUSTRIAL APPLICABILITY

As described above, the present invention is useful in an unprecedented and completely new safe service extension platform which realizes three features: "service extensibility", "retention of service safety" and "seamless service extension operation".

The invention claimed is:

1. A safe service extension receiving apparatus for associating services with an execute form, and for extending the services associated with the execute form, the safe service extension receiving apparatus comprising:
   a receiving section for receiving the execute form, the received execute form including (i) a service-dependent Application Program Interface (API) for extending the services associated with the received execute form, (ii) a Capi for calling the service-dependent API, and (iii) service identification information for associating the received execute form with a service;
   an executing section for executing the services associated with the received execute form, and for providing an execution result to a user; and
   a service extension section for extending the services associated with the received execute form according to the service identification information included in the received execute form, the services associated with the received execute form being extended by changing the execute form or adding to the execute form, the services associated with the received execute form only being extended by calling the service-dependent API, and the service-dependent API only being called according to the Capi included in the received execute form.

2. The safe service extension receiving apparatus according to claim 1, wherein the service extension section extends the services associated with the received execute form by providing a new service.

3. The safe service extension receiving apparatus according to claim 2, wherein a parent/child relationship is defined between a plurality of services, and in the case where a call for the service-dependent API by the Capi included in the received execute form designates, as a process target, a service-dependent resource associated with a service, the service-dependent resource can be processed only when a service associated with the received execute form is an ancestor of the service which the service-dependent resource is associated.

4. The safe service extension receiving apparatus according to claim 2, wherein in a case where the received execute form is associated with a metaservice, at least one of the services associated with the received execute form can be extended by calling the service-dependent API.

5. The safe service extension receiving apparatus according to claim 2, wherein the received execute form is sent from at least one service provision section.

6. The safe service extension receiving apparatus according to claim 1, wherein the service extension section extends the services associated with the received execute form by starting a service.

7. The safe service extension receiving apparatus according to claim 6, wherein a parent/child relationship is defined between a plurality of services, and in the case where a call for the service-dependent API by the Capi included in the received execute form designates, as a process target, a service-dependent resource associated with a service, the service-dependent resource can be processed only when a service associated with the received execute form is an ancestor of the service which the service-dependent resource is associated.

8. The safe service extension receiving apparatus according to claim 6, wherein in a case where the received execute form is associated with a metaservice, at least one of the services associated with the received execute form can be extended by calling the service-dependent API.

9. The safe service extension receiving apparatus according to claim 6, wherein the received execute form is sent from at least one service provision section.

10. The safe service extension receiving apparatus according to claim 1, wherein a parent/child relationship is defined between a plurality of services, and in the case where a call for the service-dependent API by the Capi included in the received execute form designates, as a process target, a service-dependent resource associated with a service, the service-dependent resource can be processed only when a service associated with the received execute form is an ancestor of the service which the service-dependent resource is associated.

11. The safe service extension receiving apparatus according to claim 1, wherein in a case where the received execute form is associated with a metaservice, at least one of the services associated with the received execute form can be extended by calling the service-dependent API.

12. The safe service extension receiving apparatus according to claim 11, wherein in the case where the received execute form is associated with the metaservice, all of the services associated with the received execute form can be extended by calling the service-dependent API, and in a case where the received execute form is not associated with the metaservice, the services cannot be extended by calling the service-dependent API.

13. The safe service extension receiving apparatus according to claim 11, wherein the received execute form is a control content including content which satisfies requirements that are to be satisfied by contents, the control content is transmitted with at least one of the contents, with information for designating the control content from at least one of the contents, and with the service-dependent API that can only be processed by the control content.

14. The safe service extension receiving apparatus according to claim 13, wherein the service-dependent API controls automatic storage of a specific service content.

15. The safe service extension receiving apparatus according to claim 1, wherein the received execute form is sent from at least one service provision section.

16. A safe service extension receiving method for associating services with an execute form, and for extending the services associated with the execute form, the safe service extension receiving method comprising:

receiving the execute form, the received execute form including (i) a service-dependent Application Program Interface (API) for extending the services associated with the received execute form, (ii) a Capi for calling the service-dependent API, and (iii) service identification information for associating the received execute form with a service;

executing the services associated with the received execute form, and providing an execution result to a user; and extending the services associated with the received execute form according to the service identification information included in the received execute form, the services associated with the received execute form being extended by changing the execute form or adding to the execute form, the services associated with the received execute form only being extended by calling the service-dependent API, and the service-dependent API only being called according to the Capi included in the received execute form.

17. A safe service extension receiving program recorded on a computer-readable recording medium for associating services with an execute form and for extending the services associated with the execute form, the safe service extension receiving program causing a computer to execute a method comprising:

receiving the execute form, the received execute form including (i) a service-dependent Application Program Interface (API) for extending the services associated with the received execute form, (ii) a Capi for calling the service-dependent API, and (iii) service identification information for associating the received execute form with a service;

executing the services associated with the received execute form, and providing an execution result to a user; and extending the services associated with the received execute form according to the service identification information included in the received execute form, the services associated with the received execute form being extended by changing the execute form or adding to the execute form, the services associated with the received execute form only being extended by calling the service-dependent API, and the service-dependent API only being called according to the Capi included in the received execute form.

* * * * *